US012524892B2

(12) United States Patent
Yu

(10) Patent No.: US 12,524,892 B2
(45) Date of Patent: Jan. 13, 2026

(54) SYSTEMS AND METHODS FOR IMAGE REGISTRATION

(71) Applicant: SHANGHAI UNITED IMAGING HEALTHCARE CO., LTD., Shanghai (CN)

(72) Inventor: Wenjun Yu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 399 days.

(21) Appl. No.: 18/146,445

(22) Filed: Dec. 26, 2022

(65) Prior Publication Data

US 2023/0131722 A1 Apr. 27, 2023

Related U.S. Application Data

(63) Continuation of application No. PCT/CN2020/132357, filed on Nov. 27, 2020.

(30) Foreign Application Priority Data

Jun. 24, 2020 (CN) .......................... 202010586672.0

(51) Int. Cl.
*G06T 7/33* (2017.01)
*G06T 7/30* (2017.01)

(52) U.S. Cl.
CPC .... *G06T 7/337* (2017.01); *G06T 2207/20212* (2013.01); *G06T 2207/30004* (2013.01); *G06T 2207/30196* (2013.01)

(58) Field of Classification Search
CPC .......... G06T 7/337; G06T 2207/20212; G06T 2207/30004; G06T 7/33;
(Continued)

(56) References Cited

U.S. PATENT DOCUMENTS 9,053,541 B2 * 6/2015 Piper ......................... G06T 7/33
2014/0029812 A1 * 1/2014 Kriston ..................... G06T 7/70
382/128

(Continued)

FOREIGN PATENT DOCUMENTS

CN 101427924 A 5/2009
CN 107993236 A 5/2018
(Continued)

OTHER PUBLICATIONS

International Search Report in PCT/CN2020/132357 mailed on Mar. 22, 2021, 5 pages.
(Continued)

*Primary Examiner* — Gregory A Morse
*Assistant Examiner* — David Alexander Wambst
(74) *Attorney, Agent, or Firm* — METIS IP LLC

(57) ABSTRACT

The present disclosure is related to systems and methods for image registration. The method includes obtaining a first image of a first modality associated with a subject and a second image of a second modality associated with the subject. The method includes determining a first region of interest (ROI) in the first image and a second ROI in the second image, wherein the first ROI and the second ROI correspond to a same region of the subject. The method includes registering the first ROI and the second ROI.

20 Claims, 17 Drawing Sheets

1310

1320        1330

(58) Field of Classification Search
CPC . G06T 2207/30196; G06T 2207/10081; G06T 2207/10104; G06T 2207/30056; G06T 2207/30061; G06T 7/30; G06T 7/0012; G06T 2207/10088
See application file for complete search history.

(56) References Cited

U.S. PATENT DOCUMENTS

2017/0061629 A1* 3/2017 Zhu .......................... G06T 5/90
2025/0152298 A1   5/2025 Brandao et al.

FOREIGN PATENT DOCUMENTS

| CN | 108171738 | A | | 6/2018 | | |
|----|-----------|---|---|--------|---|---|
| CN | 111179231 | A | | 5/2020 | | |
| CN | 111325714 | A | | 6/2020 | | |
| CN | 108171738 | B | * | 2/2022 | ............... | G06T 7/33 |
| KR | 101885562 | B1 | * | 8/2018 | ............. | A61B 6/032 |
| WO | WO-2020190821 | A1 | * | 9/2020 | ........... | A61B 6/5217 |
| WO | 2021258638 | A1 | | 12/2021 | | |

OTHER PUBLICATIONS

Written Opinion in PCT/CN2020/132357 mailed on Mar. 22, 2021, 5 pages.

* cited by examiner 810 820

1110  1120  1130

1210

1220

1310

1320            1330

1410

1420

1510

1520    1530

1610

1620

1710

1720    1730

SYSTEMS AND METHODS FOR IMAGE REGISTRATION

CROSS-REFERENCE TO RELATED APPLICATIONS

This application is a Continuation of International Application No. PCT/CN2020/132357, filed on Nov. 27, 2020, which claims priority of Chinese Patent Application No. 202010586672.0, filed on Jun. 24, 2020, the contents of each of which are hereby incorporated by reference.

TECHNICAL FIELD

This disclosure generally relates to systems and methods for image processing, and more particularly, relates to systems and methods for image registration.

BACKGROUND

Medical imaging techniques including, e.g., magnetic resonance imaging (MRI), positron emission tomography (PET), computed tomography (CT), single-photon emission computed tomography (SPECT), etc., are widely used in clinical diagnosis and/or treatment. For example, a multi-modality imaging system may generate one or more functional images (e.g., a PET image) and one or more structural images (e.g., a CT image), which may provide more diagnostic information. One or more lesion locations may be determined based on a registration of the functional image(s) and corresponding anatomical image(s). Thus, it is desirable to develop effective methods and systems for image registration in a medical system.

SUMMARY

According to an aspect of the present disclosure, a method for image registration may be implemented on a computing device having at least one processor and at least one storage device. The method may include obtaining a first image of a first modality associated with a subject and a second image of a second modality associated with the subject. The method may include determining a first region of interest (ROI) in the first image and a second ROI in the second image. The first ROI and the second ROI may correspond to a same region of the subject. The method may include registering the first ROI and the second ROI.

In some embodiments, the method may include obtaining a plurality of first sub-images and a plurality of second sub-images. The method may include obtaining the first image by stitching the plurality of first sub-images. The method may include obtaining the second image by stitching the plurality of second sub-images.

In some embodiments, the method may include performing a transformation operation on the second ROI to generate a transformed second ROI such that the transformed second ROI is registered with the first ROI.

In some embodiments, the method may include stitching the transformed second ROI with at least one region in the second image other than the second ROI.

In some embodiments, the method may include obtaining, based on the first image, at least two first display images of at least two different first views. The method may include transmitting the at least two first display images to a terminal device for display. The method may include obtaining, via the terminal device, a first input associated with the first ROI in each of the at least two first display images. The method may include determining, based on the first input, the first ROI in the first image.

In some embodiments, the method may include obtaining, based on the second image, at least two second display images of at least two different second views. The method may include transmitting the at least two second display images to a terminal device for display. The method may include obtaining, via the terminal device, a second input associated with the second ROI in each of the at least two second display images. The method may include determining, based on the second input, the second ROI in the second image.

In some embodiments, the method may include obtaining at least one first display image based on the first image. The method may include transmitting the at least one first display image to a terminal device for display. The method may include obtaining at least one second display image based on the second image. The method may include transmitting the at least one second display image to the terminal device for display. The method may include obtaining, via the terminal device, a first input associated with a first feature point in the at least one first display image, and a second input associated with a second feature point in the at least one second display image, wherein the first feature point and the second feature point correspond to the same region of the subject. The method may include determining, based on the first input, the first ROI in the first image. The method may include determining, based on the second input, the second ROI in the second image.

In some embodiments, the first display image or the second display image may include at least one of a coronal image of the subject, a sagittal image of the subject, or a transverse image of the subject.

In some embodiments, the method may include obtaining feature information of the first ROI. The method may include obtaining first coordinate information of the first feature point based on the first input. The method may include determining the first ROI in the first image based on the first coordinate information of the first feature point and the feature information of the first ROI.

In some embodiments, the method may include obtaining, via the terminal device, a third input associated with an adjustment of the first ROI. The method may include adjusting the first ROI in the first image based on third input.

In some embodiments, the method may include obtaining feature information of the second ROI. The method may include obtaining second coordinate information of the second feature point based on the second input. The method may include determining the second ROI in the second image based on the second coordinate information of the second feature point and the feature information of the second ROI.

In some embodiments, the method may include obtaining, via the terminal device, a fourth input associated with an adjustment of the second ROI. The method may include adjusting the second ROI in the second image based on fourth input.

In some embodiments, the method may include registering, based on at least one image feature of the first ROI and at least one image feature of the second ROI, the first ROI and the second ROI according to a registration algorithm.

In some embodiments, the first coordinate information and the second coordinate information may be designated as one or more initial values of the registration algorithm.

In some embodiments, the image feature may include at least one of a grayscale feature, a gradient feature, an edge feature, or a texture feature.

According to another aspect of the present disclosure, a system for image registration may include at least one storage device storing a set of instructions, and at least one processor in communication with the at least one storage device. When executing the stored set of instructions, the at least one processor may cause the system to perform a method. The method may include obtaining a first image of a first modality associated with a subject and a second image of a second modality associated with the subject. The method may include determining a first region of interest (ROI) in the first image and a second ROI in the second image. The first ROI and the second ROI may correspond to a same region of the subject. The method may include registering the first ROI and the second ROI.

According to still another aspect of the present disclosure, a non-transitory computer readable medium may include at least one set of instructions. When executed by at least one processor of a computing device, the at least one set of instructions may cause the at least one processor to effectuate a method. The method may include obtaining a first image of a first modality associated with a subject and a second image of a second modality associated with the subject. The method may include determining a first region of interest (ROI) in the first image and a second ROI in the second image. The first ROI and the second ROI may correspond to a same region of the subject. The method may include registering the first ROI and the second ROI.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
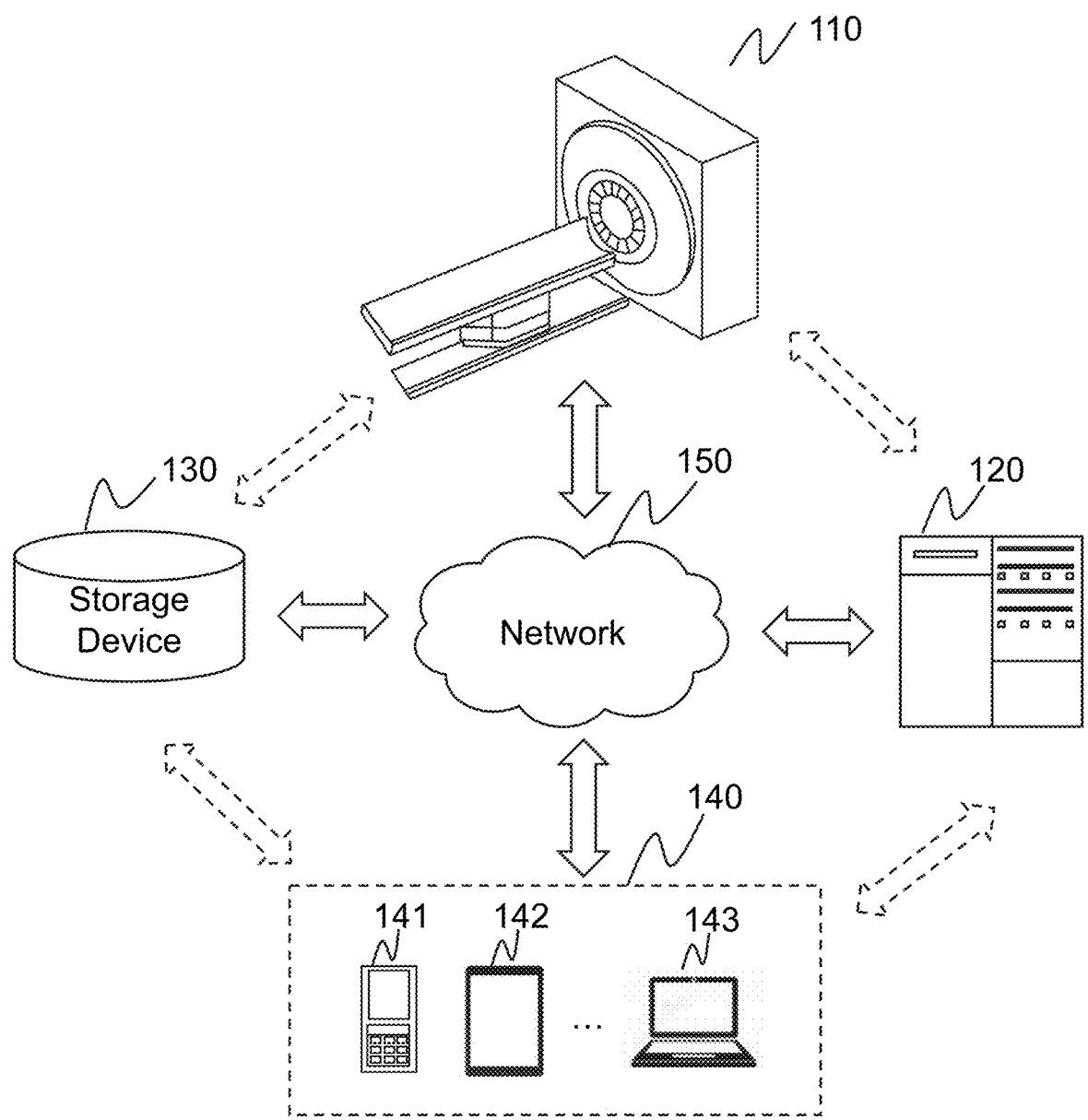
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "anatomical structure" in the present disclosure may refer to gas (e.g., air), liquid (e.g., water), solid (e.g., stone), cell, tissue, organ of a subject, or any combination thereof, which may be displayed in an image and really exist in or on the subject's body. The term "region," "location," and "area" in the present disclosure may refer to a location of an anatomical structure shown in the image or an actual location of the anatomical structure existing in or on the subject's body, since the image may indicate the actual location of a certain anatomical structure existing in or on the subject's body. The term "an image of a subject" may be referred to as the subject for brevity.

For illustration purposes, the following description is provided to help better understanding an image registration process. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

In some embodiments, a multi-modality imaging (e.g., a PET-CT imaging) of a subject may be performed at a plurality of sessions corresponding to a plurality of regions of the subject if the size of the subject to be scanned exceeds a maximum field of view (FOV) of a multi-modality imaging device. As used herein, a session refers to a scan in which a region of a subject is scanned (imaged or treated). After a plurality of first sub-images (e.g., a plurality of PET sub-images) and a plurality of second sub-images (e.g., a plurality of CT sub-images) are obtained in a plurality of sessions, an image stitching operation may be performed on the plurality of first sub-images and the plurality of second sub-images to generate a first image (e.g., a PET image) and a second image (e.g., a CT image) of the subject, respectively. As used herein, image stitching refers to a process of combining multiple sub-images with overlapping fields of view to produce a stitched panorama or a high-resolution image. In addition, an image registration operation may also be performed on the first image (e.g., the PET image) and the second image (e.g., the CT image). As used herein, image registration refers to a process of transforming spatial information of different images into a common coordinate system in order to compare or integrate the data obtained from the different images. Usually, the first image and the second image may be registered based on a preset relationship between a first coordinate system associated with a first imaging device that acquires the first image and a second coordinate system associated with a second imaging device that acquires the second image. However, the multi-modality imaging of the subject may last a relatively long time (e.g., 30 minutes-60 minutes), and one or more portions (e.g., the head, the chest) of the subject may move during the scan, which may lead to a low registration quality of the first image and the second image.

In order to improve the quality and/or efficiency of image registration, a plurality of registration approaches (e.g., a conventional automatic registration approach, a conventional manual registration approach, a conventional point registration approach) are provided. According to a conventional automatic registration approach, a first image and a second image may be automatically registered based on one or more first image features (e.g., a grayscale feature) of the first image and one or more second image features (e.g., a grayscale feature) of the second image according to an image registration algorithm (e.g., an iterative registration algorithm) without user intervention. However, the performance of such a conventional automatic registration approach may depend on parameter(s) of the image registration algorithm. In addition, distributions of gray values of elements in the first image and/or the second image may also affect the accuracy of the conventional automatic registration approach. When a difference between a first region of the subject reflected in the first image (or referred to as a field of view of the first image) and a second region of the subject reflected in the second image (or referred to as a field of view of the second image) is relatively large, while an overlapping portion of the first image and the second image is relatively small compared to the first image or the second image, the conventional automatic registration approach may result in local optimization. For instance, the first image includes a representation of the head and the neck of the subject, the second image includes a representation of the neck and the chest of the subject, the overlapping portion of the first image and the second image includes a representation of a small portion of the neck of the subject, the conventional automatic registration approach may result in local optimization in the registration of the first image and the second image. Furthermore, a conventional automatic registration approach lacks the ability to identify an ROI in an image (e.g., the first image, the second image). In some cases, compared to the registration quality of a registration between the first image and the second image, the registration quality of a registration between a first ROI in the first image and a corresponding second ROI in the second image may be more important to a user (e.g., a doctor) to perform a diagnosis on the ROI of the subject. For example, for a liver lesion assessment based on an image registration of two images of the chest and the abdomen of the subject, a user may pay more attention to the registration quality of the registration of a pair of ROIs associated with the liver of the subject in the two images. As another example, for a lung lesion assessment, a user may pay more attention to the registration quality of the registration of a pair of ROIs associated with a lung of the subject in the two images.

According to a conventional manual registration approach, a first image and a second image may be registered manually by a user (e.g., a doctor). For example, the user may perform a rotation operation, a translation operation, and/or a zoom operation on the first image and/or the second image to register the first image and the second image. However, the conventional manual registration approach may be complex, take the user a long time, and involves cross-user variations.

According to a conventional point registration approach, a plurality of pairs of points (e.g., a plurality of non-coplanar pairs of points) may be selected in a first image and a second image to be registered. A transformation relationship may then be determined between coordinates of the plurality of pairs of points in the first image and the second image. The first image and the second image may further be registered based on the transformation relationship. However, such a conventional point registration approach may take no consideration of element information (e.g., a gray value) of the plurality of pairs of points in the first image and the second image In addition, there may be an error between a transformation relationship that is between a selected point in the first image and a corresponding selected point in the second image and a registration relationship that is between the first image and the second image, which may lead to a low registration quality of a registration between the first image and the second image based on the spatial relationship.

An aspect of the present disclosure relates to systems and methods for image registration. According to some embodiments of the present disclosure, a processing device may obtain a first image of a first modality associated with a subject and a second image of a second modality associated with the subject. The first modality may be the same as or different from the second modality. For example, the first image may be obtained by stitching a plurality of first sub-images, and the second image may be obtained by stitching a plurality of second sub-images. The processing device may then determine a first region of interest (ROI) in the first image and a second ROI in the second image. The first ROI and the second ROI may correspond to a same region of the subject. The processing device may further register the first ROI and the second ROI.

Accordingly, at least one pair of ROIs (e.g., a first ROI and a second ROI) corresponding to a same region of the subject may be selected in the first image and the second image. The first ROI may be regarded as a reference region, and a transformation operation may be performed on the second ROI to generate a transformed second ROI such that the transformed second ROI is registered with the first ROI. In some embodiments, the transformed second ROI may then be stitched with at least one region in the second image other than the second ROI, and a stitched second image including the transformed second ROI may be generated. The accuracy of the result of image registration of medical images may be improved, thereby improving the efficiency and/or accuracy of diagnosis and/or treatment performed based thereon.

FIG. 1 is a schematic diagram illustrating an exemplary image processing system according to some embodiments of the present disclosure. As shown, the image processing system 100 may include a medical device 110, a processing device 120, a storage device 130, one or more terminal(s) 140, and a network 150. In some embodiments, the medical device 110, the processing device 120, the storage device 130, and/or the terminal(s) 140 may be connected to and/or communicate with each other via a wireless connection (e.g., the network 150), a wired connection, or a combination thereof. The image processing system 100 may include various types of connection between its components. For example, the medical device 110 may be connected to the processing device 120 through the network 150, or connected to the processing device 120 directly as illustrated by the bidirectional dotted arrow connecting the medical device 110 and the processing device 120 in FIG. 1. As another example, the terminal(s) 140 may be connected to the processing device 120 through the network 150, or connected to the processing device 120 directly as illustrated by the bidirectional dotted arrow connecting the terminal(s) 140 and the processing device 120 in FIG. 1. As still another example, the storage device 130 may be connected to the medical device 110 through the network 150, or connected to the medical device 110 directly as illustrated by the bidirectional dotted arrow connecting the medical device 110 and the storage device 130 in FIG. 1. As still another example, the storage device 130 may be connected to the terminal(s) 140 through the network 150, or connected to the terminal(s) 140 directly as illustrated by the bidirectional dotted arrow connecting the terminal(s) 140 and the storage device 130 in FIG. 1.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, "object" and "subject" are used interchangeably.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device, an ultrasound (US) device, an X-ray imaging device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

In some embodiments, the medical device 110 may transmit the image(s) via the network 150 to the processing device 120, the storage device 130, and/or the terminal(s) 140. For example, the image(s) may be sent to the processing device 120 for further processing or may be stored in the storage device 130.

The processing device 120 may process data and/or information obtained from the medical device 110, the storage device 130, and/or the terminal(s) 140. For example, the processing device 120 may obtain a first image of a first modality associated with a subject and a second image of a second modality associated with the subject. The first modality may be the same as or different from the second modality. As another example, the processing device 120 may determine a first region of interest (ROI) in a first image and a second ROI in a second image. As another example, the processing device 120 may register a first ROI in a first image and a second ROI in a second image.

In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal(s) 140. The data may include image data acquired by the processing device 120, algorithms and/or models for processing the image data, etc. For example, the storage device 130 may store an image of a subject obtained from a medical device (e.g., the medical device 110). As another example, the storage device 130 may store a first ROI in a first image and a second ROI in a second image determined by the processing device 120. In some embodiments, the storage device 130 may store data and/or instructions that the processing device 120, and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storages may include a magnetic disk, an optical disk, a solid-state drive, etc. Exemplary removable storages may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the image processing system 100 (e.g., the processing device 120, the terminal(s) 140). One or more components in the image processing system 100 may access the data or instructions stored in the storage device 130 via the network 150. In some embodiments, the storage device 130 may be integrated into the medical device 110 or the terminal(s) 140.

The terminal(s) 140 may be connected to and/or communicate with the medical device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the image processing system 100. In some embodiments, one or more components of the image processing system 100 (e.g., the medical device 110, the processing device 120, the storage device 130, the terminal(s) 140, etc.) may communicate information and/or data with one or more other components of the image processing system 100 via the network 150. For example, the processing device 120 and/or the terminal 140 may obtain image data from the medical device 110 via the network 150. As another example, the processing device 120 and/or the terminal 140 may obtain information stored in the storage device 130, or a storage device external to the image processing system 100, via the network 150. The network 150 may be and/or include a public network (e.g., the Internet), a private network (e.g., a local area network (LAN), a wide area network (WAN), etc.), a wired network (e.g., an Ethernet network), a wireless network (e.g., a Wi-Fi network), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the image processing system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the image processing system 100 may include one or more additional components and/or one or more components of the image processing system 100 described above may be omitted. Additionally or alternatively, two or more components of the image processing system 100 may be integrated into a single component. A component of the image processing system 100 may be implemented on two or more sub-components.

Figure 2:
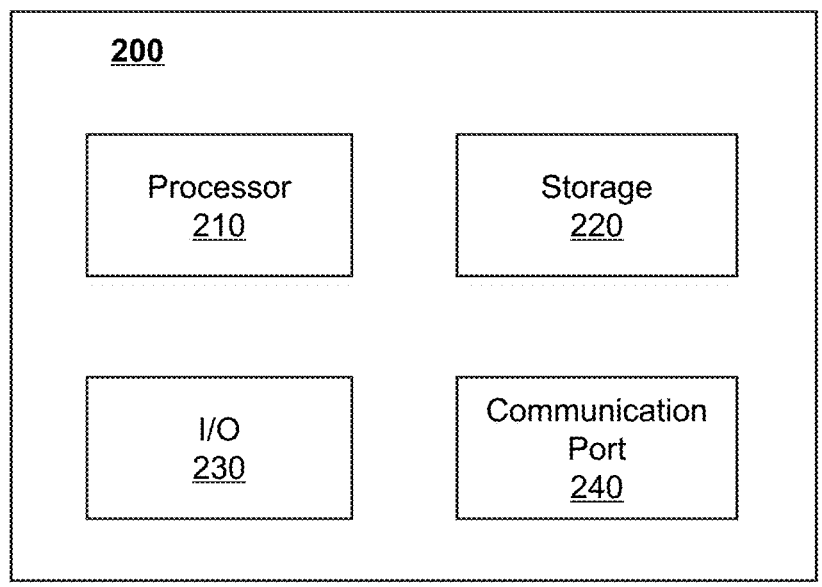
FIG. 2 is a schematic diagram illustrating exemplary hardware and/or software components of an exemplary computing device on which a processing device may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal(s) 140, the storage device 130, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the medical device 110, the terminal(s) 140, the storage device 130, and/or any other component of the image processing system 100. The storage 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal(s) 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
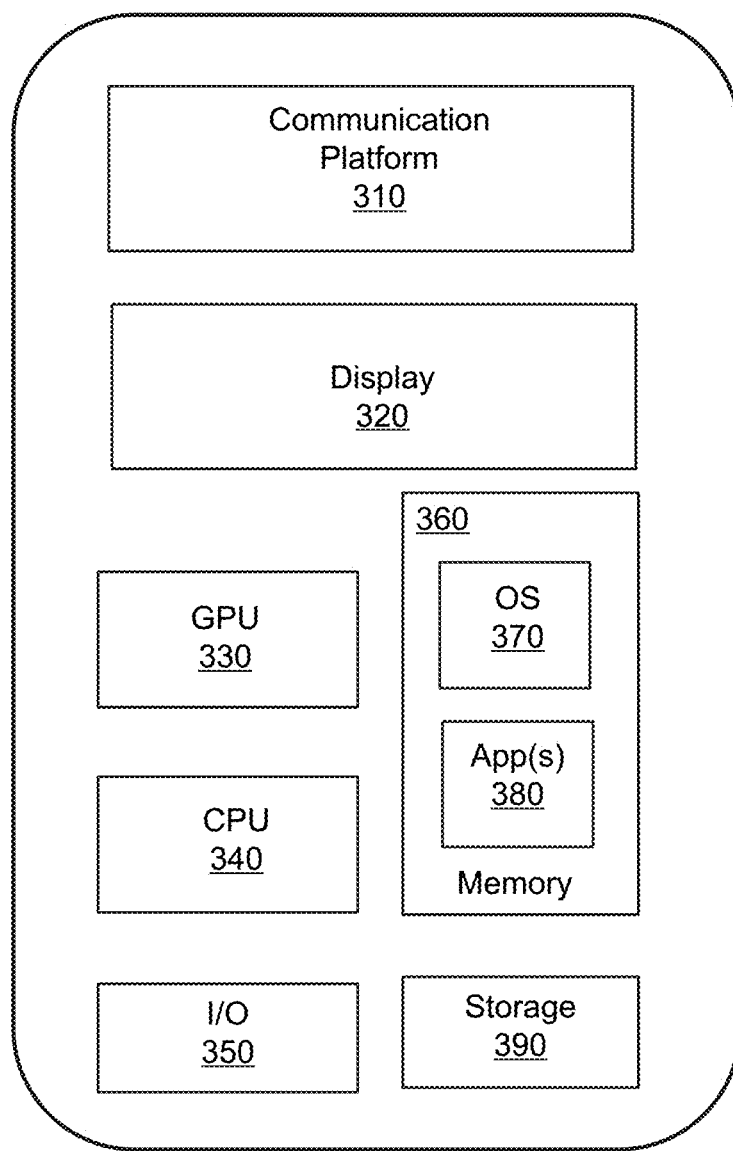
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal(s) 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the image processing system 100, and enable data and/or signal to be transmitted between the mobile device 300 and other components of the image processing system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the image processing system 100. For example, the communication platform 310 may transmit data and/or signals inputted by a user to other components of the image processing system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™, Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
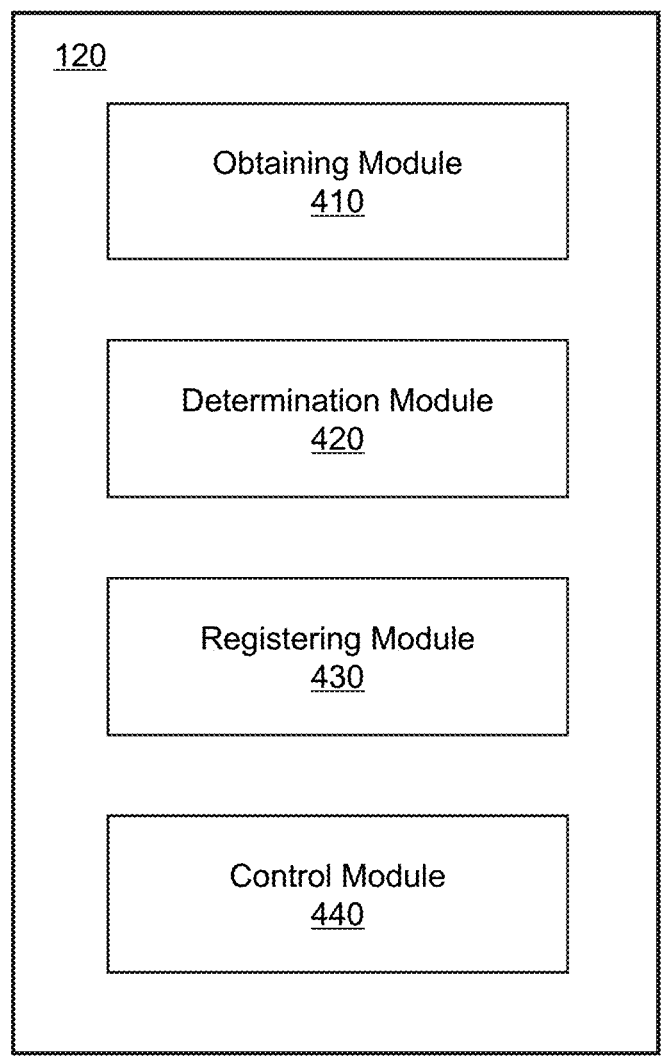
FIG. 4 is a block diagram illustrating an exemplary processing device according to some embodiments of the present disclosure.

FIG. 4 is a block diagram illustrating an exemplary processing device according to some embodiments of the present disclosure. In some embodiments, the processing device 120 may include an obtaining module 410, a determination module 420, a registering module 430, and a control module 440.

The obtaining module 410 may be configured to obtain data and/or information associated with the image processing system 100. The data and/or information associated with the image processing system 100 may include an image (e.g., a first image, a second image, a first sub-image, a second sub-image, a first display image, a second display image) of a subject, an ROI in an image, an input associated with an ROI, coordinate information of a feature point, or the like, or any combination thereof. For example, the obtaining module 410 may obtain a first image of a first modality associated with a subject and a second image of a second modality associated with the subject. As another example, the obtaining module 410 may obtain one or more display images based on an image. In some embodiments, the obtaining module 410 may obtain the data and/or the information associated with the image processing system 100 from one or more components (e.g., the medical device 110, the storage device 130, the terminal 140) of the image processing system 100 via the network 150.

The determination module 420 may be configured to determine data and/or information associated with the image processing system 100. In some embodiments, the determination module 420 may determine an ROI in an image. For example, the determination module 420 may determine an ROI in an image based on an input associated with the ROI. As another example, the determination module 420 may determine an ROI in an image based on an input associated with a feature point associated with the ROI. More descriptions of the determination of the ROI in the image may be found elsewhere in the present disclosure (e.g., FIGS. 5-7 and descriptions thereof).

The registering module 430 may be configured to register a first ROI in a first image and a second ROI in a second image. In some embodiments, the registering module 430 may register a first ROI in a first image and a second ROI in a second image based on at least one image feature of the first ROI and at least one image feature of the second ROI according to one or more image registration algorithms. The image feature may include a grayscale feature, a gradient feature, an edge feature, a texture feature, or the like, or any combination thereof. Exemplary image registration algorithms may include an intensity-based algorithms, a feature-based algorithm, a transformation model algorithm (e.g., a linear transformation model, a non-rigid transformation model), a spatial domain algorithm, a frequency domain algorithm, a single-modality algorithm, a multi-modality algorithm, an automatic algorithms, and an interactive algorithms, or the like, or any combination thereof. For example, the registering module 430 may perform a transformation operation on a second ROI to generate a transformed second ROI such that the transformed second ROI is registered with a first ROI. As another example, the registering module 430 may stitch a transformed second ROI with at least one region in a second image other than the second ROI. More descriptions of the registration of the first ROI and the second ROI may be found elsewhere in the present disclosure (e.g., FIGS. 5, 7 and descriptions thereof).

The control module 440 may be configured to control one or more components (e.g., the medical device 110, the terminal 140) of the image processing system 100. For example, the control module 430 may cause a terminal device (e.g., the terminal 140) to display data and/or information associated with the image processing system 100. The data and/or information associated with the image processing system 100 may include an image (e.g., a first image, a second image, a first sub-image, a second sub-image, a first display image, a second display image) of a subject, an ROI in an image, coordinate information of a feature point, or the like, or any combination thereof.

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be added or omitted in the processing device 120. For example, the processing device 120 may further include a storage module (not shown in FIG. 4) configured to store data and/or information (e.g., a first image, a second image, a first ROI, a second ROI) associated with the image processing system 100. In some embodiments, two or more modules may be integrated into a single module. For example, the determination module 420 and the registering module 430 may be integrated into a single module.

Figure 5:
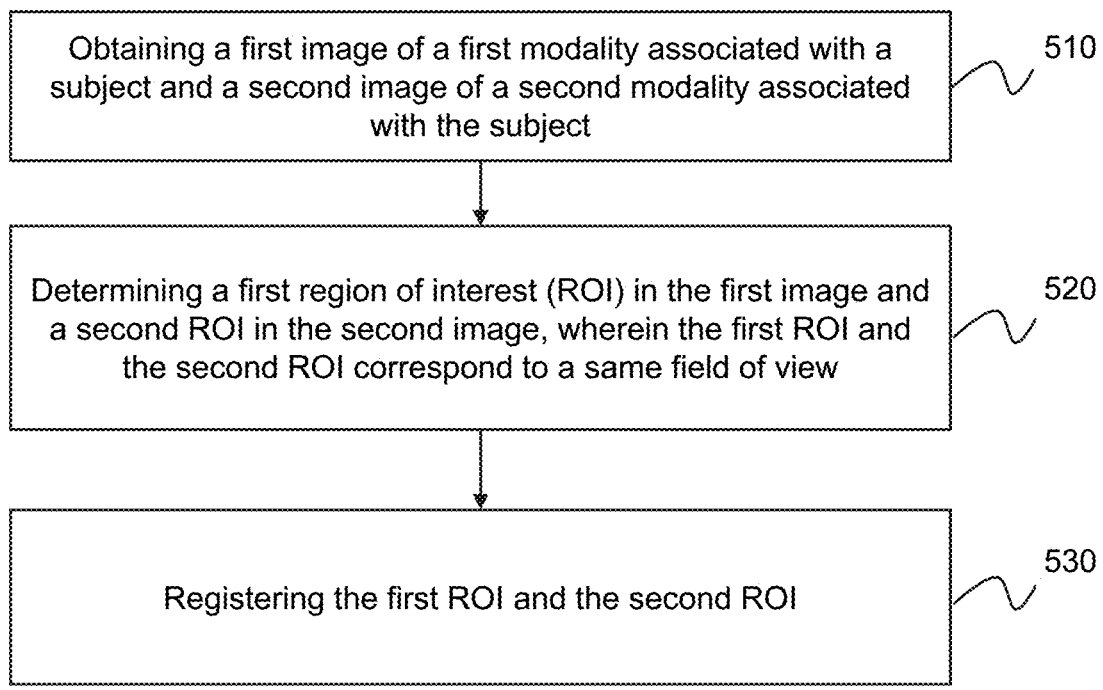
FIG. 5 is a flowchart illustrating an exemplary process for registering a first ROI in a first image and a second ROI in a second image according to some embodiments of the present disclosure.

FIG. 5 is a flowchart illustrating an exemplary process for registering a first ROI in a first image and a second ROI in a second image according to some embodiments of the present disclosure. In some embodiments, the process 500 may be implemented in the image processing system 100 illustrated in FIG. 1. For example, the process 500 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 120 (e.g., the obtaining module 410) may obtain a first image of a first modality associated with a subject and a second image of a second modality associated with the subject.

In some embodiments, the first image and/or the second image may include a medical image. For example, the first image and/or the second image may include a CT image, an MR image, a PET image, an ultrasound (US) image, an X-ray image, or the like. In some embodiments, the first image and/or the second image may include a two-dimensional (2D) image, a three-dimensional (3D) image, a four-dimensional (4D) image (e.g., a time series of 3D images), or the like.

In some embodiments, the second modality may be different from the first modality. For example, the first image may be an MR image acquired by an MRI device, and the second image may be a CT image, a PET image, an X-ray image, a US image, or the like. In some embodiments, the second modality may be the same as the first modality. For example, the first image and the second image may be PET images acquired by a same PET device or different PET devices.

As used herein, a modality of a specific image (e.g., the first image, the second image) of a specific subject may be defined by a medical device (e.g., an imaging device) acquiring the specific image, one or more scanning parameters used by the medical device scanning the specific subject, an image reconstruction technique for generating the specific image, or the like, or any combination thereof. The subject may be biological or non-biological. For example, the subject may include a patient, a man-made object, or the like, as described elsewhere in the present disclosure (e.g., FIG. 1 and the descriptions thereof). Different images of a same subject acquired by different medical devices may correspond to different modalities. For example, an MR image of a specific subject obtained by an MRI device may be considered a different modality than a PET image of the specific subject obtained by a PET device. Different images of a same subject generated using different image reconstruction techniques based on same imaging data (e.g., projection data) may correspond to different modalities. For example, an image generated using an image reconstruction technique (e.g., a back-projection technique) based on imaging data (e.g., projection data) may be considered a different modality than another image generated using another image reconstruction technique (e.g., an iteration reconstruction technique) based on the same imaging data (e.g., projection data). Different images generated using a same medical device but based on different scanning parameters may correspond to different modalities. For example, an MR image generated based on k-space data acquired by an MRI device according to a spin-echo sequence may be considered a different modality than another MR image generated based on k-space data acquired by the same MRI device according to a gradient echo sequence.

In some embodiments, the processing device 120 may obtain the first image and/or the second image from one or more components (e.g., the medical device 110, the terminal 140, and/or the storage device 130) of the image processing system 100 or an external storage device via the network 150. For example, the medical device 110 may transmit acquired imaging data (e.g., projection data) to the storage device 130, or any other storage device for storage. The processing device 120 may obtain the imaging data from the storage device 130, or any other storage device, and reconstruct the first image and/or the second image based on the imaging data. As another example, the processing device 120 may obtain the first image and/or the second image from the medical device 110 directly.

In some embodiments, the processing device 120 may obtain a plurality of first sub-images and a plurality of second sub-images. The plurality of first sub-images and/or the plurality of second sub-images may be obtained by performing a stitching scan on the subject. As used herein, a stitching scan refers to a scan in which a plurality of regions of the subject are scanned in sequence to acquire a stitched image of the regions. For instance, an image of the whole body of the subject may be obtained by performing a plurality of scans of various portions of the subject in sequence in a stitching scan. Further, the processing device 120 may obtain the first image by stitching the plurality of first sub-images. The processing device 120 may obtain the second image by stitching the plurality of second sub-images. For example, the processing device 120 may obtain the first image (or the second image) by stitching the plurality of first sub-images (or the plurality of second sub-images) according to one or more stitching algorithms. Exemplary stitching algorithms may include a Harris algorithm, a small univalue segment assimilating nucleus (SUSAN) algorithm, a scale-invariant feature transform (SIFT) algorithm, a speeded-up robust feature (SURF) algorithm, etc.

In 520, the processing device 120 (e.g., the determination module 420) may determine a first region of interest (ROI) in the first image and a second ROI in the second image.

As used herein, an ROI in an image refers to a region in the image that corresponds to a physical portion or region of interest of a subject. In some embodiments, the first ROI and the second ROI to be registered may correspond to a (substantially) same physical portion of the subject. For example, the first ROI and the second ROI may correspond to a same organ (e.g., the heart, a lung, the stomach, a liver) or a same body portion or region (e.g., the head, the neck, a hand, a leg, a foot, a spine, a pelvis, a hip) of the subject. As used herein, a first image is considered corresponding to a second image if each of both images includes a representation of a (substantially) same region of a subject. As used herein, a first region (e.g., a first ROI) of a first image is considered corresponding to a second region (e.g., a second ROI) of a second image if each of the first region and the second region includes a representation of a (substantially) same region (e.g., a physical region of interest) of a subject.

For illustration purposes, the first image may be obtained by performing a first scan on the subject, and the second image may be obtained by performing a second scan on the subject. The first scan and the second scan may be performed by a same imaging device or different imaging devices. The first scan and the second scan may be performed (substantially) simultaneously or separately. The first scan and/or the second scan may last a relatively long time, and one or more portions (e.g., the head, the chest) of the subject may move during the first scan and/or the second scan. Accordingly, a portion of the subject as reflected in the first image may have a deviation or an offset (e.g., a rotation deviation or offset, a translation deviation or offset) relative to the portion of the subject as reflected in the second image. Accordingly, a first region (e.g., a first ROI) in the first image that includes a representation of the portion of the subject may need to be registered with a corresponding second region (e.g., a second ROI) in the second image.

In some embodiments, the processing device 120 may determine the first ROI in the first image based on a first input associated with the first ROI. The processing device 120 may determine the second ROI in the second image based on a second input associated with the second ROI. See, e.g., descriptions of the determination of the first ROI and the second ROI may be found elsewhere in the present disclosure (e.g., FIG. 6 and descriptions thereof).

In some embodiments, the processing device 120 may determine the first ROI in the first image based on a first input associated with a first feature point relating to the first ROI. The processing device 120 may determine the second ROI in the second image based on a second input associated with a second feature point relating to the second ROI. See, e.g., descriptions of the determination of the first ROI and the second ROI may be found elsewhere in the present disclosure (e.g., FIG. 7 and descriptions thereof).

In 530, the processing device 120 (e.g., the registering module 430) may register the first ROI and the second ROI.

As used herein, image registration refers to a process of transforming the spatial information of different images into a common coordinate system in order to compare, integrate, etc., the data obtained from the different images. The common coordinate system may be any suitable coordinate system. For example, originally the first ROI and the second ROI may be represented in a coordinate system A and a coordinate system B, respectively. The coordinate systems A and B may be a same coordinate system or different coordinate systems. The first ROI and/or the second ROI may need to be transformed (or registered) to a common coordinate system (e.g., the coordinate system A or B, or another coordinate system). In some embodiments, the first ROI may be regarded as a reference region, and the processing device 120 may perform a transformation operation on the second ROI to generate a transformed second ROI such that the transformed second ROI is registered with the first ROI. Alternatively, the second ROI may be regarded as a reference region, and the processing device 120 may perform a transformation operation on the first ROI to generate a transformed first ROI such that the transformed first ROI is registered with the second ROI.

In some embodiments, the registration between the first ROI and the second ROI may be manually performed by a user (e.g., a doctor, an imaging specialist, a technician) on an interface (e.g., implemented on a terminal 140) that displays the first ROI and the second ROI. Alternatively, the registration between the first ROI and the second ROI may be performed by a computing device (e.g., the processing device 120) automatically according to one or more image registration algorithms. Alternatively, the registration between the first ROI and the second ROI may be performed by the computing device semi-automatically based on one or more image registration algorithms in combination with information provided by a user. Exemplary information provided by the user may include a parameter relating to the image registration algorithms, an adjustment to, or rejection or confirmation of a preliminary registration result generated by the computing device, etc.

In some embodiments, the processing device 120 may register the first ROI and the second ROI based on at least one image feature of the first ROI and at least one image feature of the second ROI according to one or more image registration algorithms. The image feature may include a grayscale feature, a gradient feature, an edge feature, a texture feature, or the like, or any combination thereof. Exemplary image registration algorithms may include an intensity-based algorithms, a feature-based algorithm, a transformation model algorithm (e.g., a linear transformation model, a non-rigid transformation model), a spatial domain algorithm, a frequency domain algorithm, a single-modality algorithm, a multi-modality algorithm, an automatic algorithms, and an interactive algorithms, or the like, or any combination thereof.

In some embodiments, the processing device 120 may register the first ROI and the second ROI by performing one or more rigid registrations and/or one or more deformable registrations (also referred to as non-rigid registration). The rigid registration refers to a registration procedure that involves global rotation(s) and/or translation(s) of all elements in an image while maintaining relative positions of all the elements in the image. As used herein, an element in an image refers to a pixel or a voxel in the image. The deformable registration refers to a process of finding a point to point (e.g., element to element) mapping relationship between the first ROI and the second ROI. In some embodiments, the processing device 120 may determine a registration matrix, a deformation field, or a displacement field that represents a transformation relationship between the first ROI and the second ROI. For example, if an element in the first ROI corresponds to a certain physical point that has coordinates C in the coordinate system A and an element in the second ROI corresponds to the same physical point has coordinates D in the coordinate system B, the registration matrix (or the deformation field, the displacement field) may record a transformation relationship between coordinates C and D.

In some embodiments, after a transformed second ROI (or a transformed first ROI) is determined, the processing device 120 may stitch the transformed second ROI (or the transformed first ROI) with at least one region in the second image other than the second ROI (or at least one region in the first image other than the first ROI). In some embodiments, an operation of the transformation of the second ROI and an operation of the stitching of the transformed second ROI with at least one region in the second image other than the second ROI may be performed (substantially) simultaneously, which may save time of the image processing.

According to some embodiments of the present disclosure, the first image may be obtained by stitching the plurality of first sub-images, and the second image may be obtained by stitching the plurality of second sub-images. By obtaining the plurality of first sub-images and the plurality of second sub-images, a representation of the subject may be displayed in detail. At least one pair of ROIs (e.g., the first ROI and the second ROI) corresponding to a same region of the subject may then be selected in the first image and the second image. The first ROI may be registered with the second ROI manually, automatically, or semi-automatically. In some embodiments, after a transformed second ROI (or a transformed first ROI) is determined, the transformed second ROI may be stitched with at least one region in the second image other than the second ROI, and a stitched second image including the transformed second ROI may be generated.

Conventionally, a plurality of first sub-images may be registered with a plurality of second sub-images, respectively. A plurality of registered (or transformed) first sub-images may be stitched to generated a stitched first image, and a plurality of registered (or transformed) second sub-images may be stitched to generated a stitched second image. For example, the plurality of first sub-images may be obtained by performing a plurality of scans of various portions of the subject in a first stitching scan. Similarly, the plurality of second sub-images may be obtained by performing a plurality of scans of various portions of the subject in a second stitching scan. Further, a specific first sub-image may be registered with a corresponding second sub-image to determine a registration relationship, and other first sub-images may be registered with corresponding second sub-images based on the registration relationship, respectively. In these cases, if only a portion of the subject (e.g., the head of the subject) moves or different portions of the subject move by different amounts during the first stitching scan and/or the second stitching scan, regions associated with other portions of the subject in the stitched first image may have a deviation or an offset relative to corresponding regions in the stitched second image. Compared to the conventional ways, the systems and methods for image registration disclosed herein may be more accurate and efficient by, e.g., registering a first ROI in the first image and a second ROI in the second image. The quality of the registration of the first image and the second image may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, a plurality of pairs of ROIs may be determined in the first image and the second image. For example, a plurality of first ROIs may be determined in the first image, and a plurality of corresponding second ROIs may be determined in the second image. For each pair of the plurality of pairs of ROIs, a first ROI and a second ROI of the pair of ROIs may be registered. After a plurality of transformed second ROIs (or a plurality of transformed first ROIs) are determined, the processing device 120 may stitch the plurality of transformed second ROI (or the plurality of transformed first ROIs) with at least one region in the second image other than the plurality of second ROIs (or at least one region in the first image other than the plurality of first ROIs).

Figure 6:
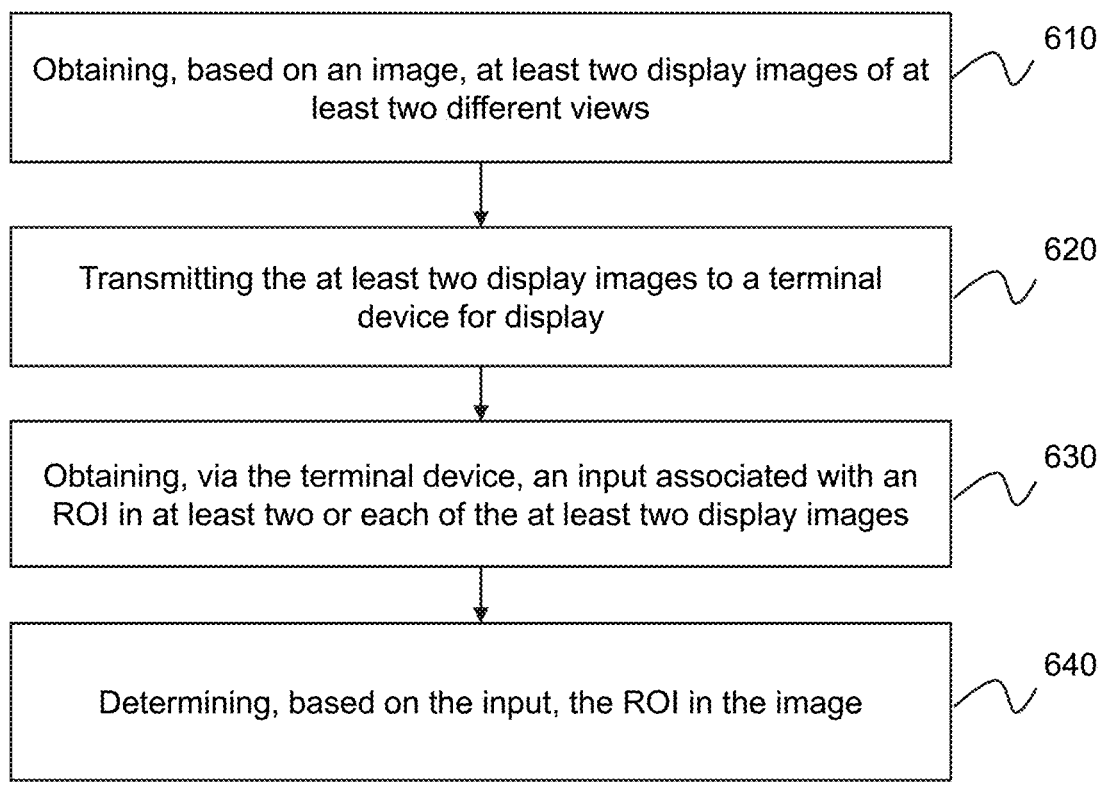
FIG. 6 is a flowchart illustrating an exemplary process for determining an ROI in an image according to some embodiments of the present disclosure.

FIG. 6 is a flowchart illustrating an exemplary process for determining an ROI in an image according to some embodiments of the present disclosure. In some embodiments, the process 600 may be implemented in the image processing system 100 illustrated in FIG. 1. For example, the process 600 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, operation 520 may be performed according to process 600.

In 610, the processing device 120 (e.g., the obtaining module 410) may obtain, based on an image, at least two display images of at least two different views.

In some embodiments, the display image may include a coronal image of the subject, a sagittal image of the subject, a transverse image of the subject, or the like. For example, the image may be 3D image data, and the processing device 120 may extract the at least two display images from the 3D image data. As another example, the processing device 120 may obtain the at least two display images based on the image according to a multiplanar reconstruction (MPR) algorithm. As used herein, multiplanar reconstruction (MPR) refers to an image reconstruction technique that allows the reconstruction of tomographic images in any plane, at any depth, and any magnification.

In 620, the processing device 120 (e.g., the control module 440) may transmit the at least two display images to a terminal device for display.

For example, the processing device 120 may transmit the at least two display images to the terminal device (e.g., the terminal 140) for display. A user may view the at least two images on the terminal device (e.g., the terminal 140).

In 630, the processing device 120 (e.g., the obtaining module 410) may obtain, via the terminal device, an input associated with the ROI in at least two or each of the at least two first display images.

In some embodiments, the user may select the ROI on the display image displayed on the terminal device (e.g., the interface of the terminal device) via an input component of the terminal device (e.g., a mouse, a touch screen). For example, the user may draw a bounding box on the display image to select the ROI. Alternatively, the user may specify a plurality of reference points on the display image to select the ROI. An area enclosing the plurality of reference points may be determined as the ROI in the display image.

In 640, the processing device 120 (e.g., the determination module 420) may determine, based on the input, the ROI in the image.

In some embodiments, the processing device 120 may determine feature information of the ROI based on the input associated with the ROI in the at least two or each of the at least two display images. The feature information of the ROI may include a position, a height, a width, a thickness, or the like, of the ROI. As used herein, a width of an ROI refers to a length of the ROI (e.g., a length at the center of the ROI, a maximum length of the ROI) along a direction perpendicular to a sagittal plane of the subject. As used herein, a height of an ROI refers to a length of the ROI (e.g., a length at the center of the ROI, a maximum length of the ROI) along a direction perpendicular to a transverse plane of the subject. As used herein, a thickness of an ROI refers to a length of the ROI (e.g., a length at the center of the ROI, a maximum length of the ROI) along a direction perpendicular to a coronal plane of the subject. For example, the processing device 120 may determine the width and the height of the ROI based on a bounding box corresponding to the ROI in a coronal image of the subject. The processing device 120 may determine the thickness of the ROI based on a bounding box corresponding to the ROI in a sagittal image or a transverse image of the subject. Further, the processing device 120 may determine the ROI in the image based on the feature information of the ROI.

It should be noted that process 600 may be performed to determine a first ROI in a first image and/or a second ROI in a second image referred to in FIG. 5.

According to some embodiments of the present disclosure, a plurality of first display images and a plurality of second display images may be displayed to a user of the image processing system 100, which may facilitate the user to select the first ROI in the first image and the second ROI in the second image. In addition, the first image may be registered with the second image by registering the first ROI in the first image and the second ROI in the second image. The image registration systems and methods disclosed herein may implement a registration between two corresponding images by registering corresponding ROIs of two images, and accordingly the quality of image registration may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more operations may be combined into a single operation. For example, operations 610 and 620 may be combined into a single operation. As another example, operations 630 and 640 may be combined into a single operation. In some embodiments, a first ROI in a first image and a second ROI in a second image may need to be determined. An operation for determining the first ROI in the first image and an operation for determining the second ROI in the second image may be performed (substantially) simultaneously in parallel or separately. For example, the terminal device may display at least two first display images and at least two second display images simultaneously. The at least two first display images and the at least two second display images may facilitate the user to perform an analysis and/or a determination. For example, the user may view the at least two first display images and the at least two second display images via the terminal device, and determine whether a registration operation needs to be performed on the first image and the second image. In response to a determination that a registration operation needs to be performed, the user may determine a first input associated with the first ROI in each of the at least two first display images, and a second input associated with the second ROI in each of the at least two second display images. Further, the first ROI in the first image may be determined based on the first input, and the second ROI in the second image may be determined based on the second input.

Figure 7:
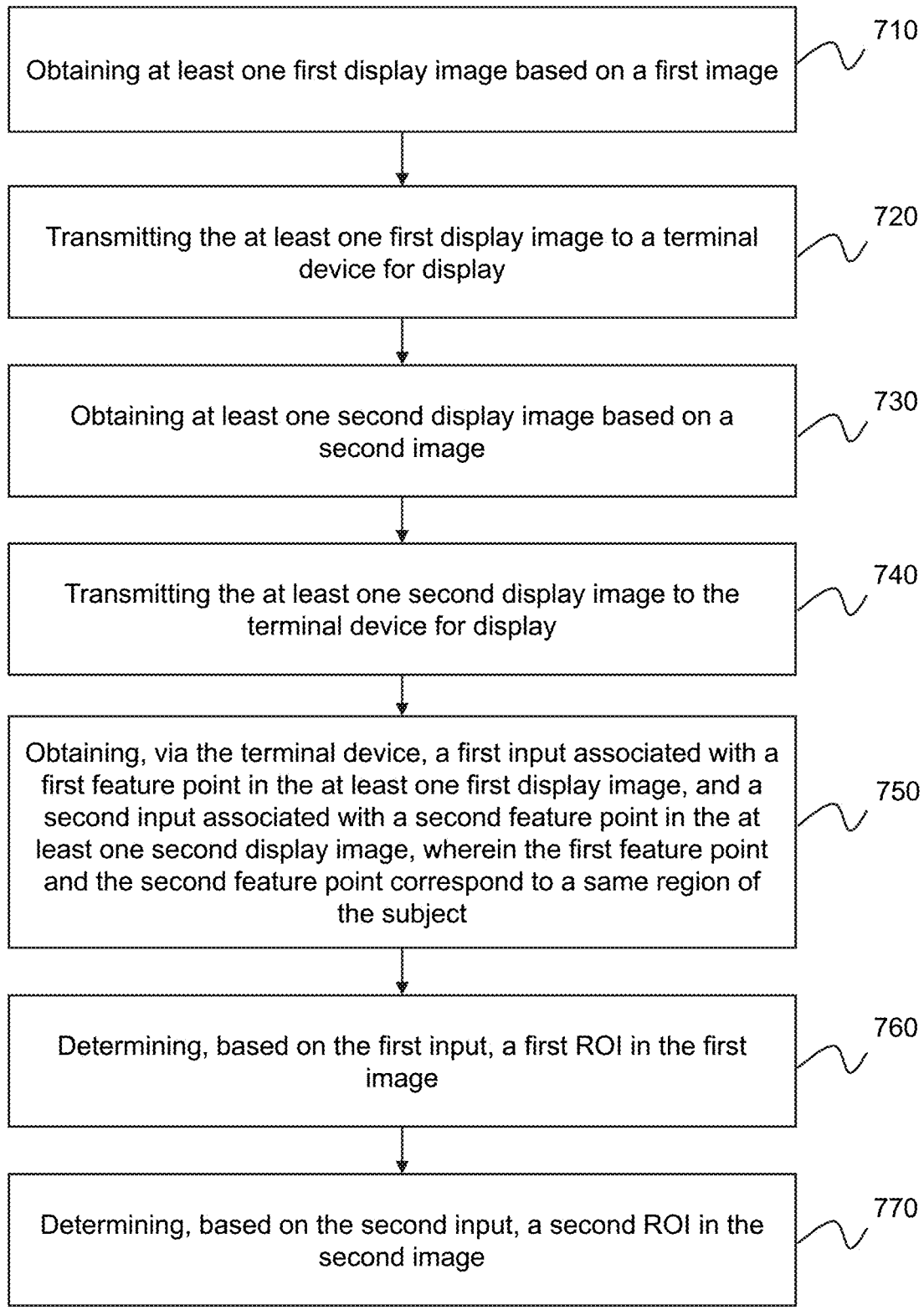
FIG. 7 is a flowchart illustrating an exemplary process for determining a first ROI in a first image and a second ROI in a second image according to some embodiments of the present disclosure.

FIG. 7 is a flowchart illustrating an exemplary process for determining a first ROI in a first image and a second ROI in a second image according to some embodiments of the present disclosure. In some embodiments, the process 700 may be implemented in the image processing system 100 illustrated in FIG. 1. For example, the process 700 may be stored in the storage device 130 and/or the storage (e.g., the storage 220, the storage 390) as a form of instructions, and invoked and/or executed by the processing device 120 (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, operation 520 may be performed according to process 700.

In 710, the processing device 120 (e.g., the obtaining module 410) may obtain at least one first display image based on the first image.

Operation 710 may be performed in a similar manner as operation 610 as described in connection with FIG. 6, the descriptions of which are not repeated here.

In 720, the processing device 120 (e.g., the control module 440) may transmit the at least one first display image to a terminal device for display.

Operation 720 may be performed in a similar manner as operation 620 as described in connection with FIG. 6, the descriptions of which are not repeated here.

In 730, the processing device 120 (e.g., the obtaining module 410) may obtain at least one second display image based on the second image.

Operation 730 may be performed in a similar manner as operation 610 as described in connection with FIG. 6, the descriptions of which are not repeated here.

In 740, the processing device 120 (e.g., the control module 440) may transmit the at least one second display image to the terminal device for display.

Operation 740 may be performed in a similar manner as operation 620 as described in connection with FIG. 6, the descriptions of which are not repeated here.

In 750, the processing device 120 (e.g., the obtaining module 410) may obtain, via the terminal device, a first input associated with a first feature point in the at least one first display image, and a second input associated with a second feature point in the at least one second display image. The first feature point and the second feature point may correspond to a same region of the subject.

In some embodiments, the first feature point and/or the second feature point may correspond to a representative physical point in a body region (e.g., the head, the neck, a hand, a leg, a foot, a spine, a pelvis, a hip) of the subject. For example, the first feature point and the second feature point may be a point (e.g., a center point) within the body region of the subject.

In some embodiments, the user may identify a specific body region (e.g., an organ or tissue) in the at least one first display image and the at least one second display image, respectively, based on user experience. Further, the user may select the first feature point corresponding to the specific body region (e.g., a center point in the specific body region) on the at least one first display image, and the second feature point corresponding to the specific body region (e.g., a center point in the specific body region) on the at least one second display image via an input component of the terminal device (e.g., a mouse, a touch screen).

In 760, the processing device 120 (e.g., the determination module 420) may determine, based on the first input, the first ROI in the first image.

In some embodiments, the processing device 120 may obtain feature information of the first ROI. The feature information of the first ROI may include a height, a width, a thickness, or the like, of the first ROI, as described in connection with FIG. 6. The feature information of the first ROI may be manually set by a user of the image processing system 100, or be determined by one or more components (e.g., the processing device 120) of the image processing system 100. The processing device 120 may then obtain first coordinate information of the first feature point based on the first input. For example, a coordinate system may be provided for the first image to define a position of an element (e.g., a pixel, a voxel) in the first image. The processing device 120 may obtain first coordinate information of the first feature point in the coordinate system based on the first input. Further, the processing device 120 may determine the first ROI in the first image based on the first coordinate information of the first feature point and the feature information of the first ROI. For example, the processing device 120 may regard the first feature point as a center point, and expand from the center point to different directions according to the feature information (e.g., the height, the width, the thickness) of the first ROI, to determine the first ROI in the first image.

In some embodiments, after the first ROI is determined in the first image, the first image including the first ROI may be transmitted to the terminal device for display. The processing device 120 may obtain a third input associated with an adjustment of the first ROI. The processing device 120 may then adjust the first ROI based on the third input. For example, the user may modify the position, the height, the width, and/or the thickness of the first ROI displayed in the first image by dragging and/or editing a bounding box corresponding to the first ROI.

In 770, the processing device 120 (e.g., the determination module 420) may determine, based on the second input, the second ROI in the second image.

In some embodiments, the processing device 120 may obtain feature information of the second ROI. The processing device 120 may obtain second coordinate information of the second feature point based on the second input. Further, the processing device 120 may determine the second ROI in the second image based on the second coordinate information of the second feature point and the feature information of the second ROI. The determination of the second ROI in the second image may be performed in a similar manner with that of the first ROI in the first image as described in connection with operation 760, the descriptions of which are not repeated here.

In some embodiments, after the second ROI is determined in the second image, the second image including the second ROI may be transmitted to the terminal device for display. The processing device 120 may obtain a fourth input associated with an adjustment of the second ROI. The processing device 120 may then adjust the second ROI based on the fourth input. For example, the user may modify the position, the height, the width, and/or the thickness of the second ROI displayed in the second image by dragging and/or editing a bounding box corresponding to the second ROI.

After the first ROI in the first image and the second ROI in the second image are determined, the processing device 120 may register the first ROI and the second ROI. In some embodiments, the processing device 120 may register, according to one or more image registration algorithms as described elsewhere in the present disclosure, the first ROI and the second ROI based on at least one image feature of the first ROI and at least one image feature of the second ROI determined according to, e.g., the process illustrated in FIG. 5. For example, the processing device 120 may register the first ROI and the second ROI based on the at least one image feature of the first ROI and the at least one image feature of the second ROI according to an iterative registration algorithm. A similarity measure used in the iterative registration process may include a mean square error, mutual information, and a cross-correlation, or the like. The first coordinate information and the second coordinate information may be designated as one or more initial values of the iterative registration algorithm.

According to some embodiments of the present disclosure, the first feature point may be determined in the at least one first display image, and the second feature point may be determined in the at least one second display image. The first ROI may be determined based on the first coordinate information of the first feature point, and the second ROI may be determined based on the second coordinate information of the second feature point. In addition, during the registration process of the first ROI and the second ROI, the first coordinate information and the second coordinate information may be designated as one or more initial values of the registration algorithm, which may avoid a local optimization and accordingly improve the accuracy of the registration process.

Compared to a conventional point registration algorithm, the systems and methods disclosed herein may improve the accuracy of the registration process, especially when a difference between a first region of the subject reflected in the first image (or referred to as a field of view of the first image) and a second region of the subject reflected in the second image (or referred to as a field of view of the second image) is relatively large, while an overlapping portion of the first image and the second image is relatively small compared to the first image or the second image. In addition, the first ROI and the second ROI may be registered based on image feature(s) of the first ROI, image feature(s) of the second ROI, the first coordinate information, and the second coordinate information according to one or more image registration algorithms, which may reduce the need to select many feature points.

Furthermore, during the registration process of the first ROI and the second ROI, the user does not need to manually rotate, translate, or zoom the first image or the second image. Compared to a conventional manual registration approach in which a user needs to manually register the first image and the second image, image registration performed using the systems and methods disclosed herein may be more accurate and efficient by, e.g., reducing the workload of a user, cross-user variations, and the time needed for image registration.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, two or more operations may be combined into a single operation. For example, operations 710 and 730 may be combined into a single operation. As another example, operations 720 and 740 may be combined into a single operation. In some embodiments, operations 730 may be performed before operation 720. In some embodiments, operations 710-720 and operations 730-740 may be performed simultaneously.

FIGS. 8-11 are schematic diagrams illustrating an exemplary process for registering a PET image and a CT image according to some embodiments of the present disclosure.

Figure 8:
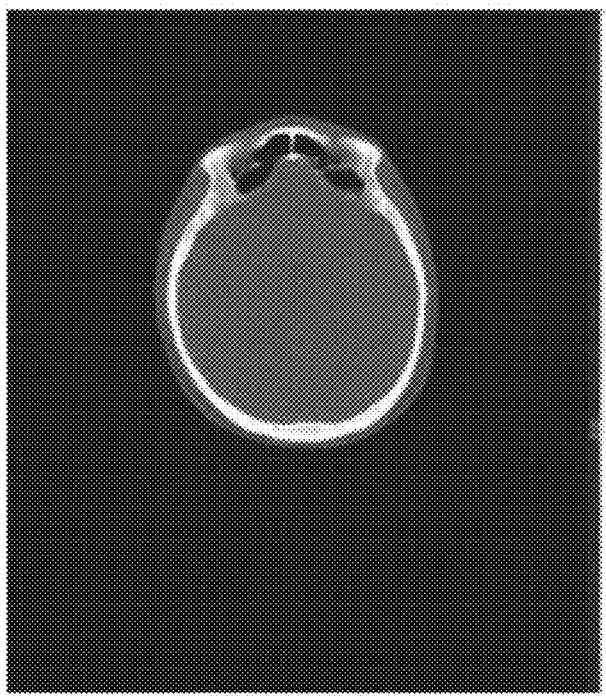
FIGS. 8-11 are schematic diagrams illustrating an exemplary process for registering a PET image and a CT image according to some embodiments of the present disclosure.
Figure 8:
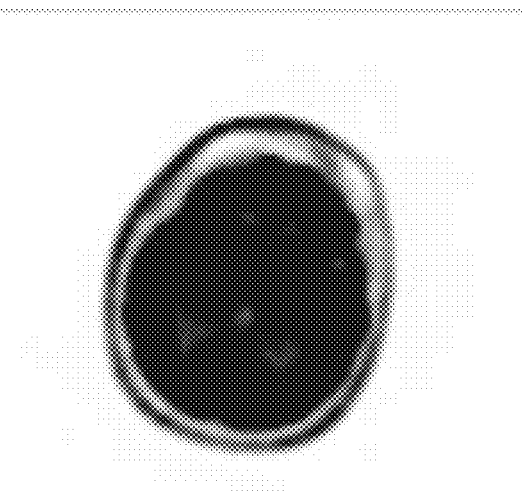
Figure 9:
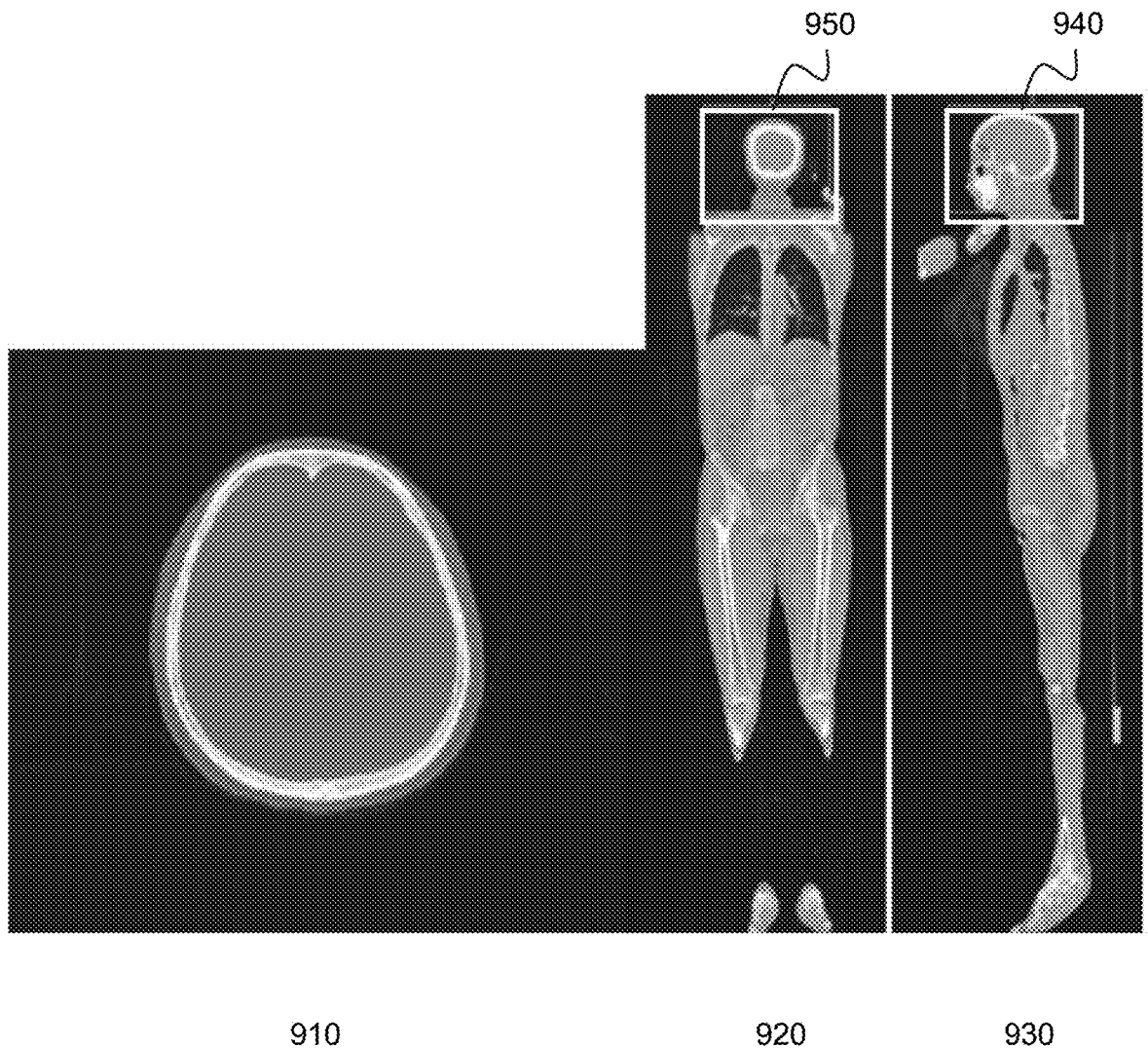
Figure 10:
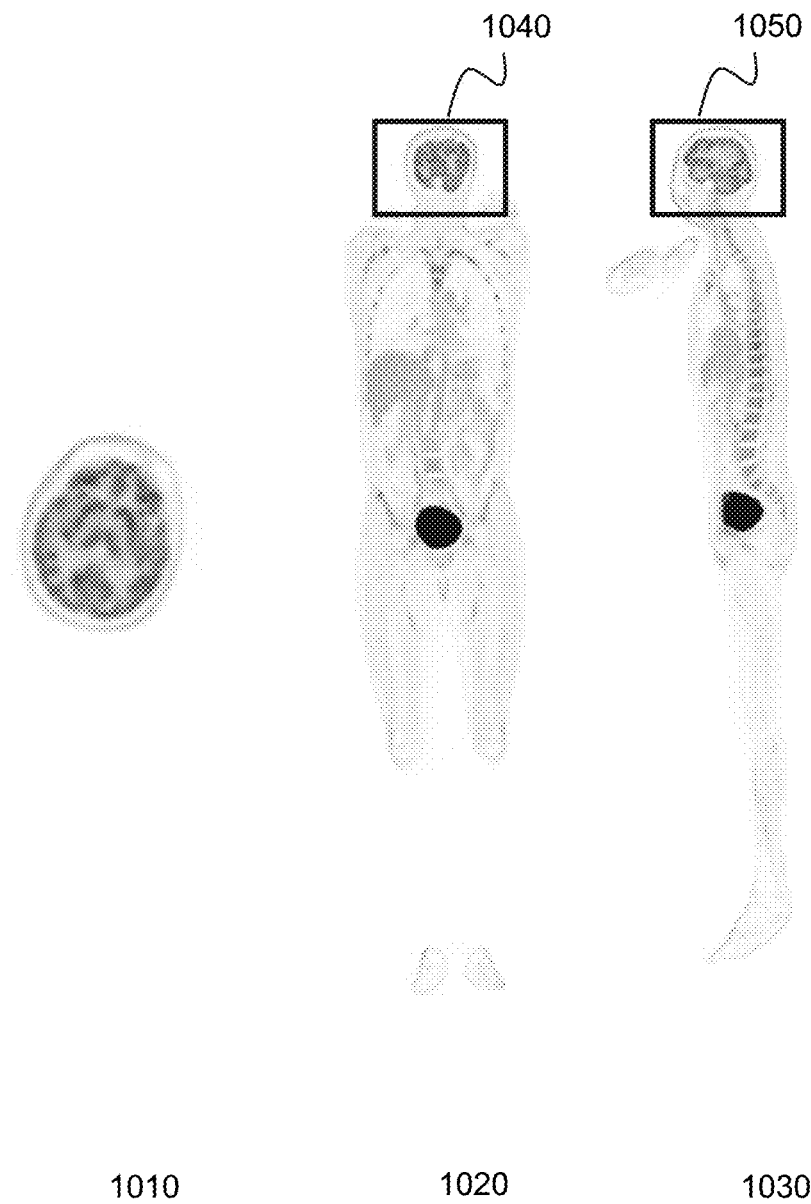

As illustrated in FIGS. 8, 9, and 10, a CT image (e.g., a CT image 810, a CT image 910, a CT image 920, a CT image 930) and a PET image (e.g., a PET image 820, a PET image 1010, a PET image 1020, a PET image 1030) are generated by performing a PET-CT scan on a subject (e.g., a patient). The CT image 810 and the CT image 910 corresponds to a transverse plane of the subject. The CT image 920 corresponds to a coronal plane of the subject. The CT image 930 corresponds to a sagittal plane of the subject. The PET image 820 and the PET image 1010 corresponds to a transverse plane of the subject. The PET image 1020 corresponds to a coronal plane of the subject. The PET image 1030 corresponds to a sagittal plane of the subject. The head of the subject moves during the PET-CT scan. If the CT image (e.g., the CT image 920) is registered with the PET image (e.g., the PET image 1020) according to a conventional registration approach (e.g., a conventional point registration approach, a conventional automated registration approach), and one or more regions associated with one or more body regions other than the head of the subject in the CT image are aligned with one or more corresponding body regions in the PET image, a region associated with the head of the subject in the CT image may have a deviation (e.g., a rotation deviation, a translation deviation) relative to a corresponding region associated with the head of the subject in the PET image.

Figure 11:
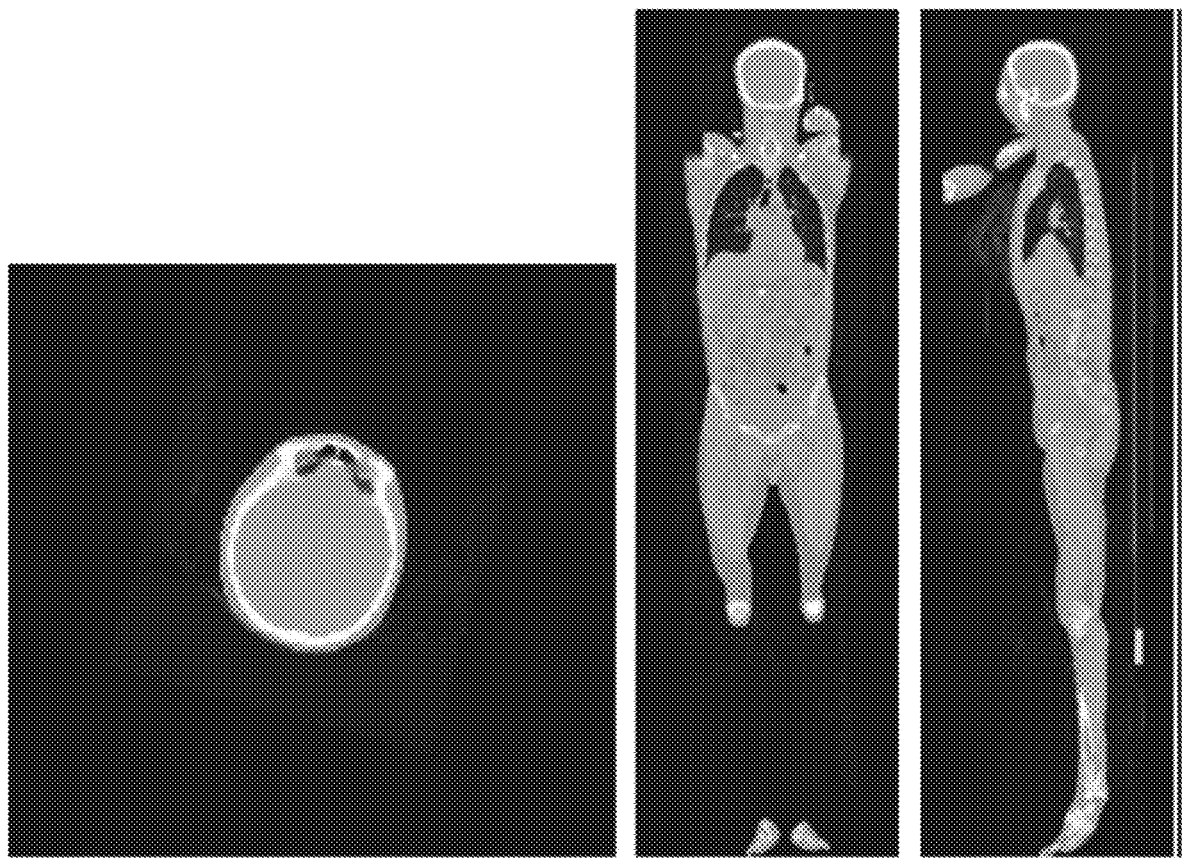

A plurality of CT images of different views (e.g., the CT image 910, the CT image 920, the CT image 930) and a plurality of PET images of the different views (e.g., the PET image 1010, the PET image 1020, the PET image 1030) are displayed on a terminal device. The user draws on the terminal device a bounding box 950 associated with a first ROI relating to the head of the subject on the CT image 920 and a bounding box 940 associated with the first ROI relating to the head of the subject on the CT image 930. The user also draws on the terminal device a bounding box 1040 associated with a second ROI relating to the head of the subject on the PET image 1020 and a bounding box 1050 associated with the second ROI relating to the head of the subject on the PET image 1030. A transformation operation is then performed on the first ROI to generate a transformed first ROI such that the transformed first ROI is registered with the second ROI. Further, the transformed first ROI is stitched with at least one region in the CT image other than the first ROI to generate a stitched CT image (e.g., a stitched CT image 1110 corresponding to a transverse plane of the subject, a stitched CT image 1120 corresponding to a coronal plane of the subject, a stitched CT image 1130 corresponding to a sagittal plane of the subject), as illustrated in FIG. 11.

Figure 12:
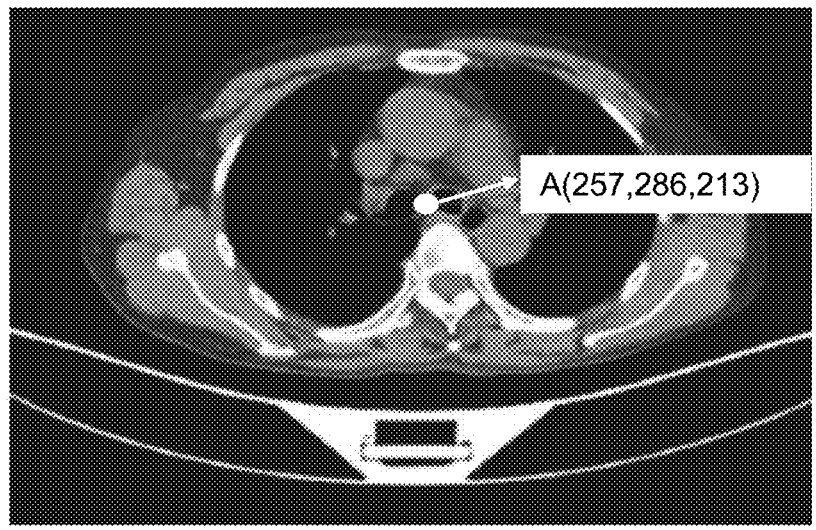
FIGS. 12-13 are schematic diagrams illustrating an exemplary process for registering a whole-body CT image and a chest CT image according to some embodiments of the present disclosure.
Figure 12:
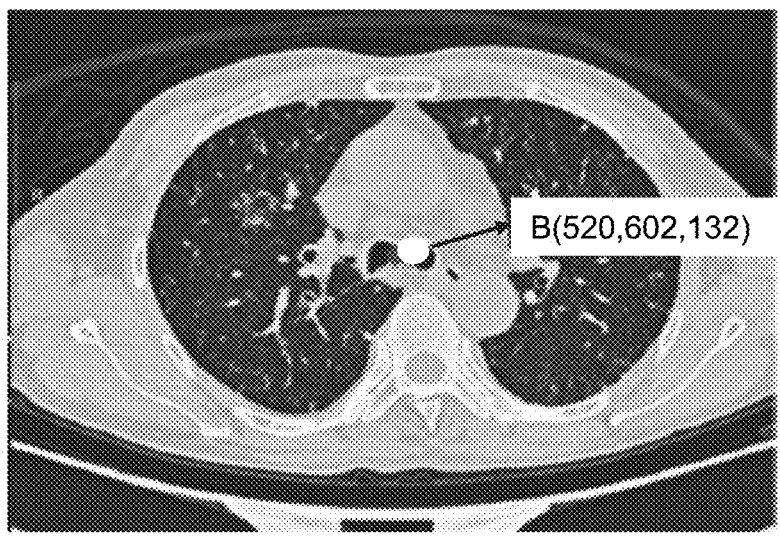
Figure 13:
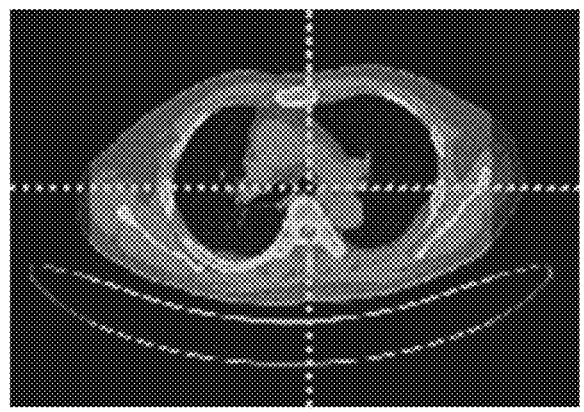
Figure 13:
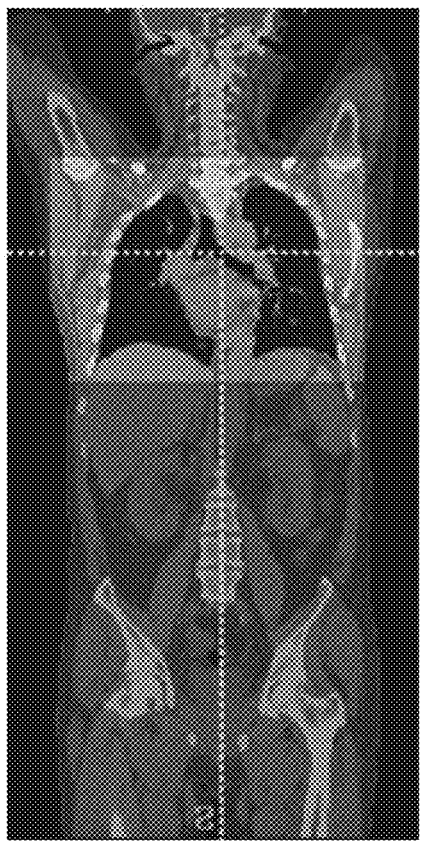
Figure 13:
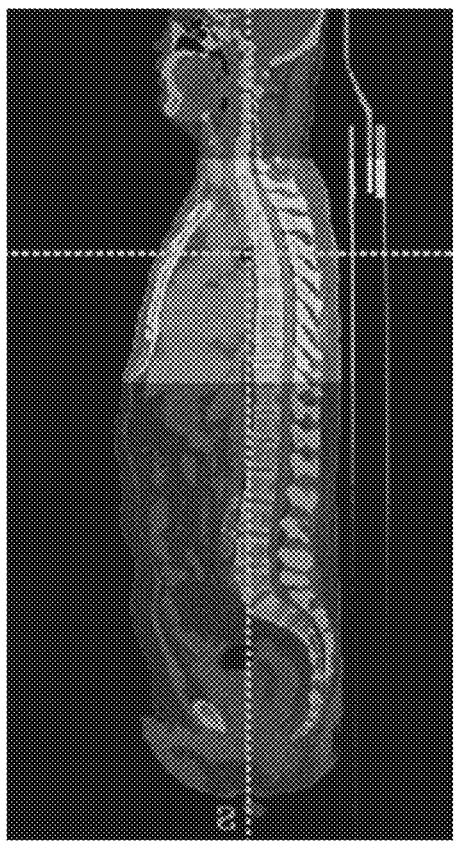

FIGS. 12-13 are schematic diagrams illustrating an exemplary process for registering a whole-body CT image and a chest CT image according to some embodiments of the present disclosure.

As illustrated in FIG. 12, a first feature point A is determined on a whole-body CT image 1210, and a second feature point B is determined on a chest CT image 1220. Coordinates of the first feature point A in an image coordinate system are (257, 286, 213), and coordinates of the second feature point B in the image coordinate system are (520, 602, 132). The first feature point A and the second feature point B correspond to a position of a tracheal bifurcation of a subject. A first ROI (not shown in FIG. 12) in the whole-body CT image 1210 is determined based on the first feature point A, and a second ROI (not shown in FIG. 12) in the chest CT image 1220 is determined based on the second feature point B, as described in connection with operations 760 and 770. Further, the first ROI is registered with the second ROI as described in connection with operation 530. For example, a transformation operation is performed on the first ROI to generate a transformed first ROI such that the transformed first ROI is registered with the second ROI. The transformed first ROI is stitched with at least one region in the whole-body CT image 1210 other than the first ROI to generate a stitched whole-body CT image (e.g., a stitched whole-body CT image 1310 corresponding to a transverse plane of the subject, a stitched whole-body CT image 1320 corresponding to a coronal plane of the subject, a stitched whole-body CT image 1330 corresponding to a sagittal plane of the subject), as illustrated in FIG. 13.

Figure 14:
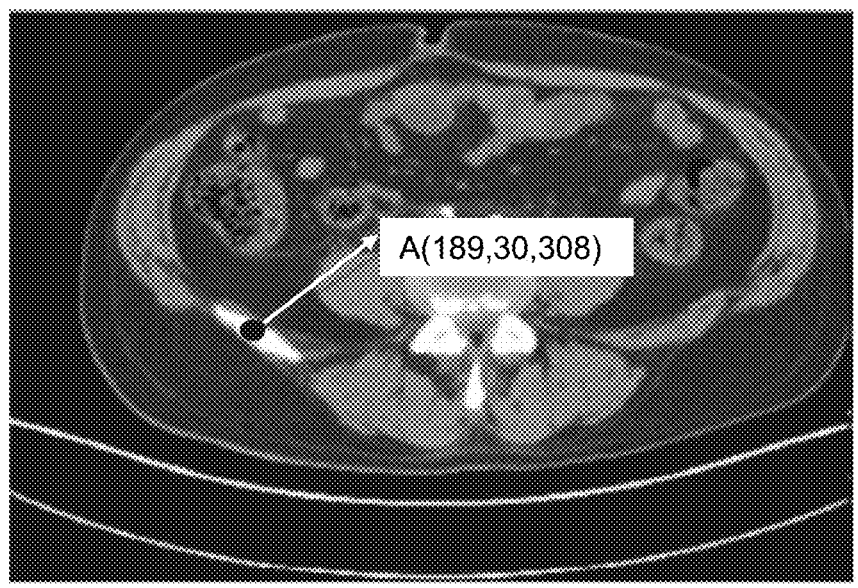
FIGS. 14-15 are schematic diagrams illustrating an exemplary process for registering a whole-body CT image and a pelvis CT image according to some embodiments of the present disclosure.
Figure 14:
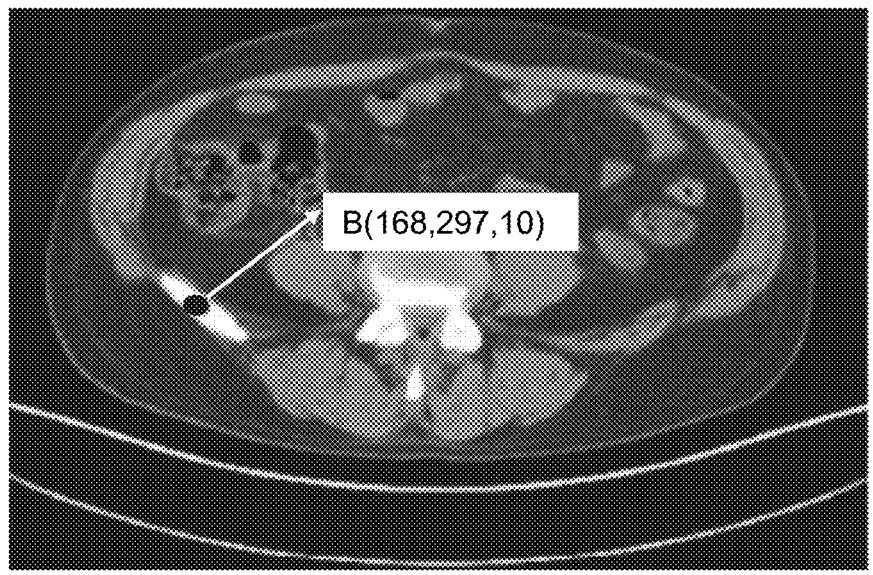
Figure 15:
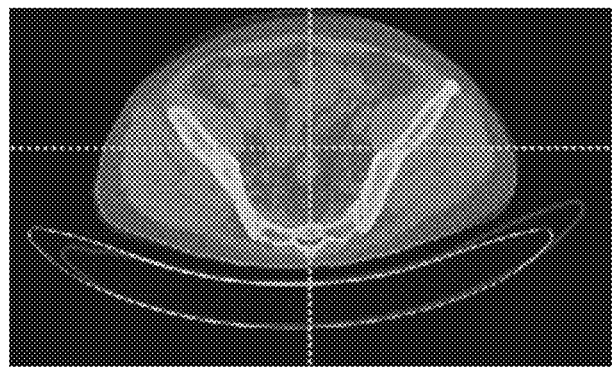
Figure 15:
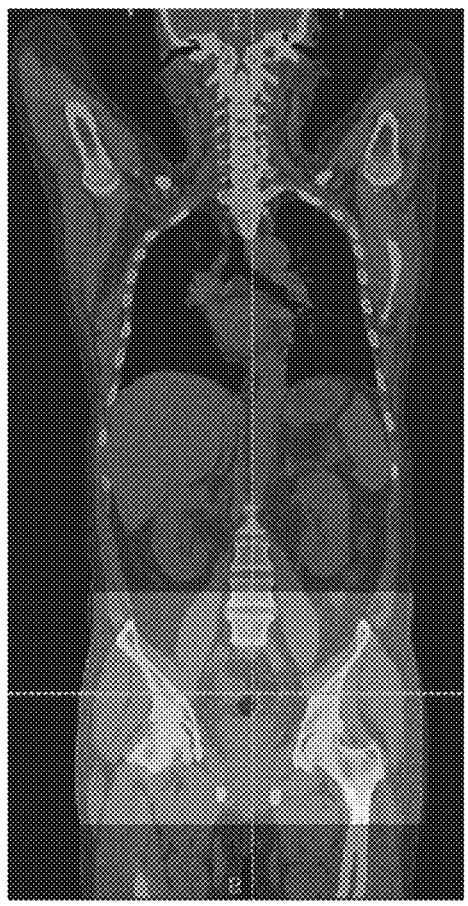
Figure 15:
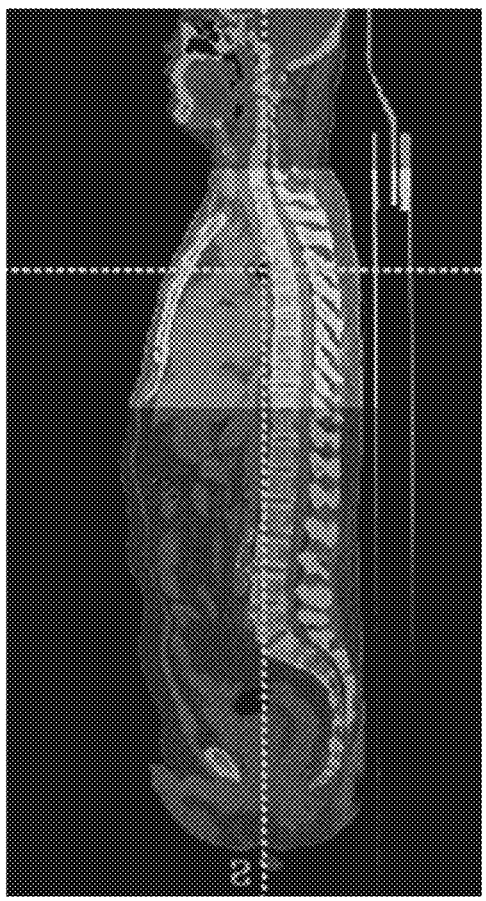

FIGS. 14-15 are schematic diagrams illustrating an exemplary process for registering a whole-body CT image and a pelvis CT image according to some embodiments of the present disclosure.

As illustrated in FIG. 14, a first feature point A is determined on a whole-body CT image 1410, and a second feature point B is determined on a pelvis CT image 1420. Coordinates of the first feature point A in an image coordinate system are (189, 30, 308), and coordinates of the second feature point B in the image coordinate system are (168, 3, 10). The first feature point A and the second feature point B correspond to a start position of a hip bone of a subject. A first ROI (not shown in FIG. 14) in the whole-body CT image 1410 is determined based on the first feature point A, and a second ROI (not shown in FIG. 14) in the pelvis CT image 1420 is determined based on the second feature point B, as described in connection with operations 760 and 770. Further, the first ROI is registered with the second ROI as described in connection with operation 530. For example, a transformation operation is performed on the first ROI to generate a transformed first ROI such that the transformed first ROI is registered with the second ROI. The transformed first ROI is stitched with at least one region in the whole-body CT image 1410 other than the first ROI to generate a stitched whole-body CT image (e.g., a stitched whole-body CT image 1510 corresponding to a transverse plane of the subject, a stitched whole-body CT image 1520 corresponding to a coronal plane of the subject, a stitched whole-body CT image 1530 corresponding to a sagittal plane of the subject), as illustrated in FIG. 15.

Figure 16:
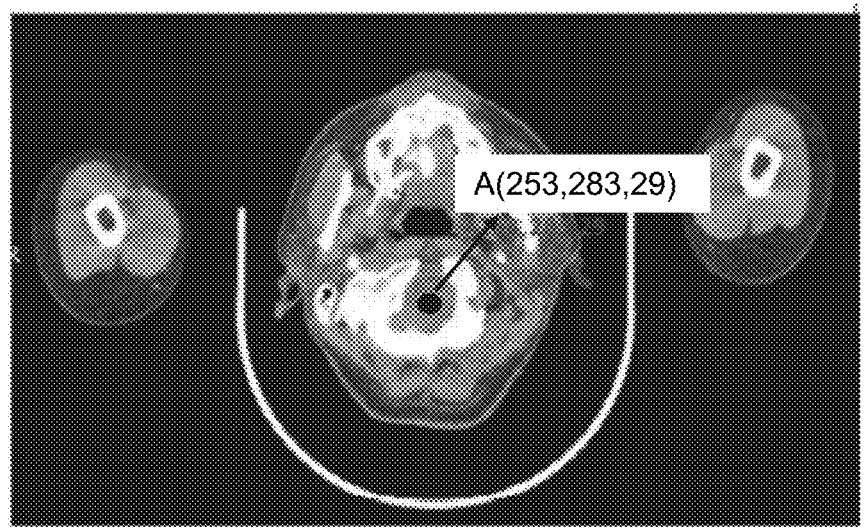
FIGS. 16-17 are schematic diagrams illustrating an exemplary process for registering a whole-body CT image and a head CT image according to some embodiments of the present disclosure.
Figure 16:
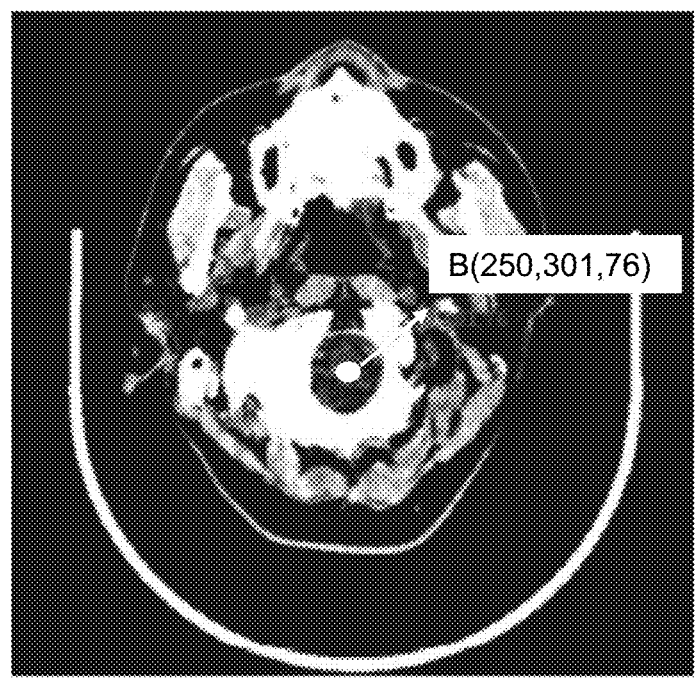
Figure 17:
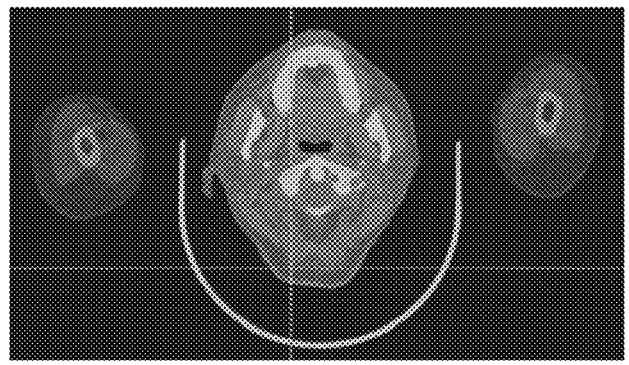
Figure 17:
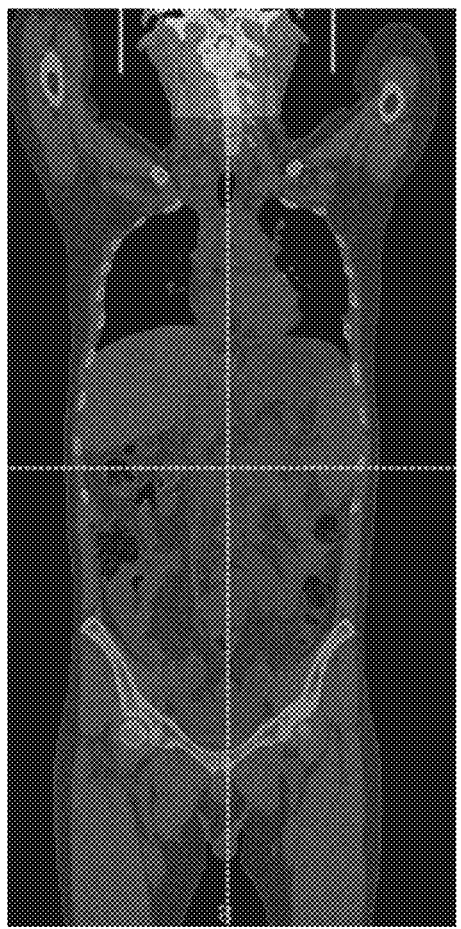
Figure 17:
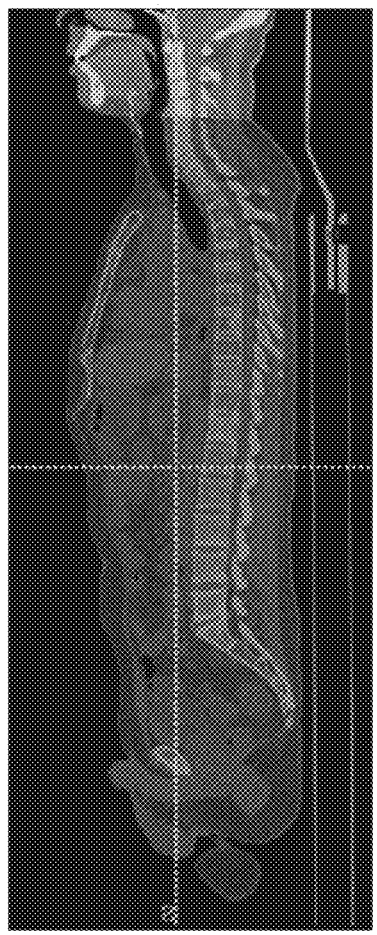

FIGS. 16-17 are schematic diagrams illustrating an exemplary process for registering a whole-body CT image and a head CT image according to some embodiments of the present disclosure.

As illustrated in FIG. 16, a first feature point A is determined on a whole-body CT image 1610, and a second feature point B is determined on a head CT image 1620. Coordinates of the first feature point A in an image coordinate system are (253, 283, 29), and coordinates of the second feature point B in the image coordinate system are (250, 301, 76). The first feature point A and the second feature point B correspond to a foramen magnum of an occipital bone of a subject. A first ROI (not shown in FIG. 16) in the whole-body CT image 1610 is determined based on the first feature point A, and a second ROI (not shown in FIG. 16) in the head CT image 1620 is determined based on the second feature point B, as described in connection with operations 760 and 770. Further, the first ROI is registered with the second ROI as described in connection with operation 530. For example, a transformation operation is performed on the first ROI to generate a transformed first ROI such that the transformed first ROI is registered with the second ROI. The transformed first ROI is stitched with at least one region in the whole-body CT image 1210 other than the first ROI to generate a stitched whole-body CT image (e.g., a stitched whole-body CT image 1710 corresponding to a transverse plane of the subject, a stitched whole-body CT image 1720 corresponding to a coronal plane of the subject, a stitched whole-body CT image 1730 corresponding to a sagittal plane of the subject), as illustrated in FIG. 17.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather,

What is claimed is:

1. A method for image registration, implemented on a computing device having at least one processor and at least one storage device, the method comprising:
    obtaining a first image of a first modality associated with a subject and a second image of a second modality associated with the subject;
    determining a first region of interest (ROI) in the first image and a second ROI in the second image, wherein the first ROI and the second ROI correspond to a same region of the subject;
    registering the first ROI and the second ROI, including:
        performing a transformation operation on the second ROI to generate a transformed second ROI such that the transformed second ROI is registered with the first ROI;
    and
    stitching the transformed second ROI with at least one region in the second image other than the second ROI.

2. The method of claim 1, wherein the obtaining a first image of a first modality and a second image of a second modality comprises:
    obtaining a plurality of first sub-images and a plurality of second sub-images;
    obtaining the first image by stitching the plurality of first sub-images; and
    obtaining the second image by stitching the plurality of second sub-images.

3. The method of claim 1, wherein the determining a first region of interest (ROI) in the first image comprises:
    obtaining, based on the first image, at least two first display images of at least two different first views;
    transmitting the at least two first display images to a terminal device for display;
    obtaining, via the terminal device, a first input associated with the first ROI in each of the at least two first display images; and
    determining, based on the first input, the first ROI in the first image.

4. The method of claim 1, wherein the determining a second ROI in the second image comprises:
    obtaining, based on the second image, at least two second display images of at least two different second views;
    transmitting the at least two second display images to a terminal device for display;
    obtaining, via the terminal device, a second input associated with the second ROI in each of the at least two second display images; and
    determining, based on the second input, the second ROI in the second image.

5. The method of claim 1, wherein the determining a first region of interest (ROI) in the first image and a second ROI in the second image comprises:
    obtaining at least one first display image based on the first image;
    transmitting the at least one first display image to a terminal device for display;
    obtaining at least one second display image based on the second image;
    transmitting the at least one second display image to the terminal device for display;
    obtaining, via the terminal device, a first input associated with a first feature point in the at least one first display image, and a second input associated with a second feature point in the at least one second display image, wherein the first feature point and the second feature point correspond to the same region of the subject;
    determining, based on the first input, the first ROI in the first image; and
    determining, based on the second input, the second ROI in the second image.

6. The method of claim 5, wherein the first display image or the second display image includes at least one of a coronal image of the subject, a sagittal image of the subject, or a transverse image of the subject.

7. The method of claim 5, wherein the determining, based on the first input, the first ROI in the first image comprises:
    obtaining feature information of the first ROI, wherein the feature information of the first ROI includes a height of the first ROI, a width of the first ROI, and a thickness of the first ROI;
    obtaining first coordinate information of the first feature point based on the first input; and
    determining the first ROI in the first image based on the first coordinate information of the first feature point and the feature information of the first ROI.

8. The method of claim 7, further comprising:
    obtaining, via the terminal device, a third input associated with an adjustment of the first ROI; and
    adjusting the first ROI in the first image based on the third input, including:
        modifying at least one of a position of the first ROI, the height of the first ROI, the width of the first ROI, and the thickness of the first ROI displayed in the first image by dragging and/or editing a bounding box corresponding to the first ROI.

9. The method of claim 7, wherein the determining, based on the second input, the second ROI in the second image comprises:
    obtaining feature information of the second ROI, wherein the feature information of the second ROI include a height of the second ROI, a width of the second ROI, and a thickness of the second ROI;
    obtaining second coordinate information of the second feature point based on the second input; and
    determining the second ROI in the second image based on the second coordinate information of the second feature point and the feature information of the second ROI.

10. The method of claim 9, further comprising:
    obtaining, via the terminal device, a fourth input associated with an adjustment of the second ROI; and
    adjusting the second ROI in the second image based on the fourth input, including:
        modifying at least one of a position of the second ROI, the height of the second ROI, the width of the second ROI, and the thickness of the second ROI displayed in the second image by dragging and/or editing a bounding box corresponding to the second ROI.

11. The method of claim 9, wherein the registering the first ROI and the second ROI comprises:
    registering, based on at least one image feature of the first ROI and at least one image feature of the second ROI, the first ROI and the second ROI according to a registration algorithm, wherein the image feature includes at least one of a grayscale feature, a gradient feature, an edge feature, and a texture feature.

12. The method of claim 11, wherein the first coordinate information and the second coordinate information are designated as one or more initial values of the registration algorithm.

13. A system for image registration, comprising:
at least one storage device storing a set of instructions; and
at least one processor in communication with the at least one storage device, when executing the stored set of instructions, the at least one processor causes the system to perform operations including:
obtaining a first image of a first modality associated with a subject and a second image of a second modality associated with the subject;
determining a first region of interest (ROI) in the first image and a second ROI in the second image, wherein the first ROI and the second ROI correspond to a same region of the subject;
registering the first ROI and the second ROI, including:
performing a transformation operation on the second ROI to generate a transformed second ROI such that the transformed second ROI is registered with the first ROI; and
stitching the transformed second ROI with at least one region in the second image other than the second ROI.

14. The system of claim 13, wherein to determine a first region of interest (ROI) in the first image and a second ROI in the second image, the at least one processor causes the system to perform operations including:
obtaining at least one first display image based on the first image;
transmitting the at least one first display image to a terminal device for display;
obtaining at least one second display image based on the second image;
transmitting the at least one second display image to the terminal device for display;
obtaining, via the terminal device, a first input associated with a first feature point in the at least one first display image, and a second input associated with a second feature point in the at least one second display image, wherein the first feature point and the second feature point correspond to the same region of the subject;
determining, based on the first input, the first ROI in the first image; and
determining, based on the second input, the second ROI in the second image.

15. A non-transitory computer readable medium, comprising at least one set of instructions, wherein when executed by at least one processor of a computing device, the at least one set of instructions cause the at least one processor to effectuate a method comprising:
obtaining a first image of a first modality associated with a subject and a second image of a second modality associated with the subject;
determining a first region of interest (ROI) in the first image and a second ROI in the second image, wherein the first ROI and the second ROI correspond to a same region of the subject;
registering the first ROI and the second ROI, including:
performing a transformation operation on the second ROI to generate a transformed second ROI such that the transformed second ROI is registered with the first ROI; and
stitching the transformed second ROI with at least one region in the second image other than the second ROI.

16. The method of claim 5, wherein at least one of the first feature point and the second feature point corresponds to a representative physical point in a body region of the subject.

17. The method of claim 7, wherein
the width of the first ROI refers to a length of the first ROI along a direction perpendicular to a sagittal plane of the subject;
the height of the first ROI refers to a length of the first ROI along a direction perpendicular to a transverse plane of the subject; and
the thickness of the first ROI refers to a length of the first ROI along a direction perpendicular to a coronal plane of the subject.

18. The method of claim 9, wherein
the width of the second ROI refers to a length of the second ROI along a direction perpendicular to a sagittal plane of the subject;
the height of the second ROI refers to a length of the second ROI along a direction perpendicular to a transverse plane of the subject;
the thickness of the second ROI refers to a length of the second ROI along a direction perpendicular to a coronal plane of the subject.

19. The method of claim 2, further comprising:
determining a registration relationship by registering a specific first sub-image with a corresponding second sub-image; and
registering first sub-images other than the specific first sub-image with corresponding second sub-images based on the registration relationship.

20. The non-transitory computer readable medium of claim 15, wherein to determine a first region of interest (ROI) in the first image and a second ROI in the second image, the at least one set of instructions cause the at least one processor to effectuate a method further comprising:
obtaining at least one first display image based on the first image;
transmitting the at least one first display image to a terminal device for display;
obtaining at least one second display image based on the second image;
transmitting the at least one second display image to the terminal device for display;
obtaining, via the terminal device, a first input associated with a first feature point in the at least one first display image, and a second input associated with a second feature point in the at least one second display image, wherein the first feature point and the second feature point correspond to the same region of the subject;
determining, based on the first input, the first ROI in the first image; and
determining, based on the second input, the second ROI in the second image.

* * * * *